(12) United States Patent
Lehman et al.

(10) Patent No.: US 8,571,975 B1
(45) Date of Patent: Oct. 29, 2013

(54) SYSTEM AND METHOD FOR SENDING MONEY VIA E-MAIL OVER THE INTERNET

(75) Inventors: Dean K. Lehman, Columbus, OH (US); Joseph R. McCullough, Delaware, OH (US); Nancy A. Orth, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/448,738

(22) Filed: Nov. 24, 1999

(51) Int. Cl.
*G06Q 40/00* (2012.01)

(52) U.S. Cl.
USPC .......................................................... 705/39

(58) Field of Classification Search
USPC .................. 705/30, 34, 35–40, 13, 42, 44
See application file for complete search history.

(56) References Cited

U.S. PATENT DOCUMENTS

| | | |
|---|---|---|
| 3,705,385 A | 12/1972 | Batz |
| 3,852,571 A | 12/1974 | Hall et al. |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,727,243 A | 2/1988 | Savar |
| 4,745,468 A | 5/1988 | Von Kohorn |
| 4,799,156 A | 1/1989 | Shavit et al. |
| 4,801,787 A | 1/1989 | Suzuki |
| 4,823,264 A | 4/1989 | Deming |
| 4,882,675 A | 11/1989 | Nichtberger et al. |

(Continued)

FOREIGN PATENT DOCUMENTS

| | | |
|---|---|---|
| CA | 2 414 038 | 12/2001 |
| CA | 2430549 | 6/2002 |

(Continued)

OTHER PUBLICATIONS

PayPal FAQ web site at http://www.paypal.com.*

(Continued)

*Primary Examiner* — Ronald Laneau
(74) *Attorney, Agent, or Firm* — Hunton & Williams LLP

(57) ABSTRACT

A method and system for transferring money from a sender to a receiver utilizing a computer network such as the Internet. The sender visits a web site and identifies, to the server over the Internet, the receiver, an e-mail address of the receiver, an amount of money to be transferred and a withdraw account from which money is to be transferred. The withdraw account can be a checking account, a checking account secured by a credit card account, or a credit card account. Money is transferred from the withdraw account and preferably deposited into a holding account. The server automatically sends an e-mail to the receiver, over the Internet, to inform the receiver that the sender has transferred money and to request the receiver to visit the web site of the server to receive money. The receiver visits the web site of the server in response to the e-mail and identifies a deposit account to which money is to be transferred.

29 Claims, 14 Drawing Sheets

(56) References Cited

U.S. PATENT DOCUMENTS

| | | | |
|---|---|---|---|
| 4,926,255 A | 5/1990 | Von Kohorn | |
| 4,941,090 A | 7/1990 | McCarthy | |
| 4,964,043 A | 10/1990 | Galvin | |
| 4,992,940 A | 2/1991 | Dworkin | |
| 5,016,270 A | 5/1991 | Katz | |
| 5,050,207 A | 9/1991 | Hitchcock | |
| 5,084,816 A | 1/1992 | Boese et al. | |
| 5,117,355 A | 5/1992 | McCarthy | |
| 5,157,717 A | 10/1992 | Hitchcock | |
| 5,189,606 A | 2/1993 | Burns et al. | |
| 5,202,826 A | 4/1993 | McCarthy | |
| 5,212,792 A | 5/1993 | Gerety et al. | |
| 5,220,501 A | 6/1993 | Lawlor et al. | |
| 5,224,034 A | 6/1993 | Katz et al. | |
| 5,233,514 A | 8/1993 | Ayyoubi et al. | 705/14 |
| 5,233,654 A | 8/1993 | Harvey et al. | |
| 5,235,509 A | 8/1993 | Mueller et al. | |
| 5,241,594 A | 8/1993 | Kung | |
| 5,262,942 A * | 11/1993 | Earle | 364/408 |
| 5,265,033 A | 11/1993 | Vajk et al. | |
| 5,283,829 A | 2/1994 | Anderson | |
| 5,287,268 A | 2/1994 | McCarthy | |
| 5,287,269 A | 2/1994 | Dorrough et al. | |
| 5,297,026 A | 3/1994 | Hoffman | 705/14 |
| 5,315,504 A | 5/1994 | Lembie | |
| 5,317,683 A | 5/1994 | Hager et al. | |
| 5,321,841 A | 6/1994 | East et al. | |
| 5,336,870 A | 8/1994 | Hughes | |
| 5,351,186 A | 9/1994 | Bullock et al. | |
| 5,381,332 A | 1/1995 | Wood | |
| 5,412,190 A | 5/1995 | Josephson et al. | |
| 5,412,708 A | 5/1995 | Katz | |
| 5,420,405 A | 5/1995 | Chasek | |
| 5,424,938 A | 6/1995 | Wagner et al. | |
| 5,426,594 A | 6/1995 | Wright et al. | 709/206 |
| 5,446,740 A | 8/1995 | Yien et al. | |
| 5,450,134 A | 9/1995 | Legate | |
| 5,450,537 A | 9/1995 | Hirai et al. | |
| 5,455,407 A | 10/1995 | Rosen | |
| 5,461,217 A | 10/1995 | Claus | |
| 5,465,206 A * | 11/1995 | Hilt et al. | 364/406 |
| 5,467,269 A | 11/1995 | Flaten | |
| 5,473,143 A | 12/1995 | Vak et al. | |
| 5,473,732 A | 12/1995 | Chang | |
| 5,477,038 A | 12/1995 | Levine et al. | |
| 5,477,040 A | 12/1995 | Lalonde | |
| 5,479,530 A | 12/1995 | Nair et al. | |
| 5,485,370 A | 1/1996 | Moss et al. | |
| 5,504,677 A | 4/1996 | Pollin | |
| 5,511,114 A | 4/1996 | Stimson et al. | |
| 5,511,117 A | 4/1996 | Zazzera | |
| 5,513,102 A | 4/1996 | Auriemma | |
| 5,513,117 A * | 4/1996 | Small | 364/479 |
| 5,532,920 A | 7/1996 | Hartrick et al. | |
| 5,534,855 A | 7/1996 | Gajnak et al. | |
| 5,537,314 A | 7/1996 | Kanter | |
| 5,537,473 A | 7/1996 | Saward | |
| 5,544,086 A | 8/1996 | Davis et al. | |
| 5,546,452 A | 8/1996 | Andrews | |
| 5,550,358 A | 8/1996 | Tait et al. | |
| 5,551,021 A | 8/1996 | Harada | |
| 5,557,334 A | 9/1996 | Legate | |
| 5,557,518 A | 9/1996 | Rosen | |
| 5,560,008 A | 9/1996 | Johnson et al. | |
| 5,568,489 A | 10/1996 | Yien et al. | |
| 5,570,295 A | 10/1996 | Isenberg | |
| 5,570,465 A | 10/1996 | Tsakanikas | |
| 5,576,951 A | 11/1996 | Lockwood | |
| 5,577,109 A | 11/1996 | Stimson et al. | |
| 5,583,778 A | 12/1996 | Wind | |
| 5,590,197 A | 12/1996 | Chen et al. | |
| 5,590,199 A | 12/1996 | Krajewski et al. | |
| 5,592,378 A | 1/1997 | Cameron et al. | |
| 5,592,553 A | 1/1997 | Guski et al. | |
| 5,592,560 A | 1/1997 | Deaton et al. | |
| 5,594,837 A | 1/1997 | Noyes | |
| 5,598,557 A | 1/1997 | Doner et al. | |
| 5,602,936 A | 2/1997 | Lynn | |
| 5,603,025 A | 2/1997 | Tabb | |
| 5,604,490 A | 2/1997 | Blakley et al. | |
| 5,606,496 A | 2/1997 | D'Agostino | |
| 5,611,052 A | 3/1997 | Dykstra | |
| 5,621,201 A | 4/1997 | Langhans et al. | |
| 5,621,789 A | 4/1997 | McCalmont et al. | |
| 5,621,812 A | 4/1997 | Deaton et al. | |
| 5,625,767 A | 4/1997 | Bartell et al. | |
| 5,634,101 A | 5/1997 | Blau | |
| 5,638,457 A | 6/1997 | Deaton et al. | |
| 5,640,577 A | 6/1997 | Scharmer | |
| 5,642,419 A | 6/1997 | Rosen | |
| 5,644,493 A | 7/1997 | Motai | |
| 5,644,778 A | 7/1997 | Burks et al. | |
| 5,649,117 A | 7/1997 | Landry | |
| 5,650,604 A | 7/1997 | Marcous et al. | |
| 5,652,786 A | 7/1997 | Rogers | |
| 5,653,914 A | 8/1997 | Holmes et al. | |
| 5,657,383 A | 8/1997 | Gerber et al. | |
| 5,659,165 A | 8/1997 | Jennings et al. | |
| 5,661,807 A | 8/1997 | Guski et al. | |
| 5,664,115 A | 9/1997 | Fraser | |
| 5,666,493 A | 9/1997 | Wojcik et al. | |
| 5,671,280 A * | 9/1997 | Rosen | 380/24 |
| 5,671,285 A | 9/1997 | Newman | |
| 5,673,309 A | 9/1997 | Woynoski et al. | |
| 5,675,637 A | 10/1997 | Szlam et al. | |
| 5,675,662 A | 10/1997 | Deaton et al. | |
| 5,677,955 A | 10/1997 | Doggett et al. | |
| 5,678,046 A | 10/1997 | Cahill et al. | |
| 5,682,524 A | 10/1997 | Freund | |
| 5,684,870 A | 11/1997 | Maloney et al. | |
| 5,684,965 A * | 11/1997 | Pickering | 705/34 |
| 5,687,322 A | 11/1997 | Deaton et al. | |
| 5,689,100 A | 11/1997 | Carrithers et al. | |
| 5,692,132 A | 11/1997 | Hogan | |
| 5,696,908 A | 12/1997 | Muehlberger et al. | |
| 5,699,528 A | 12/1997 | Hogan | |
| 5,703,344 A | 12/1997 | Bezy et al. | |
| 5,706,452 A | 1/1998 | Ivanov | |
| 5,708,422 A | 1/1998 | Blonder et al. | |
| 5,710,886 A | 1/1998 | Christensen et al. | |
| 5,710,887 A | 1/1998 | Chelliah et al. | |
| 5,710,889 A | 1/1998 | Clark et al. | |
| 5,715,298 A | 2/1998 | Rogers | |
| 5,715,314 A | 2/1998 | Payne | |
| 5,715,399 A | 2/1998 | Bezos | |
| 5,715,402 A | 2/1998 | Popolo | |
| 5,715,450 A | 2/1998 | Ambrose | |
| 5,724,424 A | 3/1998 | Gifford | |
| 5,727,163 A | 3/1998 | Bezos | |
| 5,729,594 A | 3/1998 | Klingman | |
| 5,729,693 A | 3/1998 | Holda-Fleck | 395/214 |
| 5,732,136 A | 3/1998 | Murphree et al. | |
| 5,734,838 A | 3/1998 | Robinson | |
| 5,737,414 A | 4/1998 | Walker et al. | |
| 5,740,231 A | 4/1998 | Cohn et al. | |
| 5,742,845 A | 4/1998 | Wagner | |
| 5,745,886 A | 4/1998 | Rosen | |
| 5,754,840 A | 5/1998 | Rivette et al. | |
| 5,757,917 A | 5/1998 | Rose et al. | |
| 5,758,126 A | 5/1998 | Daniels et al. | |
| 5,758,328 A | 5/1998 | Giovannoli | |
| 5,761,288 A | 6/1998 | Gray | |
| 5,761,647 A | 6/1998 | Boushy | |
| 5,761,661 A | 6/1998 | Coussens et al. | |
| 5,764,789 A | 6/1998 | Pare et al. | |
| 5,765,141 A | 6/1998 | Spector | |
| 5,765,143 A | 6/1998 | Sheldon | |
| 5,768,382 A | 6/1998 | Schneier et al. | |
| 5,774,122 A | 6/1998 | Kojima et al. | |
| 5,778,178 A | 7/1998 | Arunachalam | |
| 5,781,909 A | 7/1998 | Logan et al. | |
| 5,784,562 A | 7/1998 | Diener | |
| 5,787,403 A | 7/1998 | Randle | |
| 5,787,404 A | 7/1998 | Fernandez-Holmann | 705/35 |

(56) References Cited

U.S. PATENT DOCUMENTS

| | | | |
|---|---|---|---|
| 5,790,650 | A | 8/1998 | Dunn et al. |
| 5,790,785 | A | 8/1998 | Klug et al. |
| 5,793,861 | A | 8/1998 | Haigh |
| 5,794,178 | A | 8/1998 | Caid |
| 5,794,207 | A | 8/1998 | Walker et al. |
| 5,794,221 | A | 8/1998 | Egendorf |
| 5,794,259 | A | 8/1998 | Kikinis |
| 5,796,395 | A | 8/1998 | De Hond |
| 5,796,832 | A | 8/1998 | Kawan |
| 5,797,127 | A | 8/1998 | Walker et al. |
| 5,798,508 | A | 8/1998 | Walker et al. |
| 5,802,253 | A | 9/1998 | Gross et al. |
| 5,802,498 | A | 9/1998 | Comesanas |
| 5,802,502 | A | 9/1998 | Gell et al. |
| 5,805,719 | A | 9/1998 | Pare et al. |
| 5,815,657 | A | 9/1998 | Williams et al. |
| 5,815,665 | A | 9/1998 | Teper et al. |
| 5,815,683 | A | 9/1998 | Vogler |
| 5,818,936 | A | 10/1998 | Moshayekhi |
| 5,819,092 | A | 10/1998 | Ferguson et al. |
| 5,819,285 | A | 10/1998 | Damico et al. |
| 5,820,847 | A | 10/1998 | Low et al. |
| 5,825,003 | A | 10/1998 | Jennings et al. |
| 5,825,863 | A | 10/1998 | Walker |
| 5,825,870 | A | 10/1998 | Miloslavsky |
| 5,826,023 | A | 10/1998 | Hall et al. |
| 5,826,241 | A | 10/1998 | Stein et al. |
| 5,826,245 | A | 10/1998 | Sandberg-Diment |
| 5,826,250 | A | 10/1998 | Trefler |
| 5,828,734 | A | 10/1998 | Katz |
| 5,828,751 | A | 10/1998 | Walker et al. |
| 5,828,812 | A | 10/1998 | Khan et al. |
| 5,828,833 | A | 10/1998 | Belville et al. |
| 5,832,089 | A | 11/1998 | Kravitz et al. .................. 380/24 |
| 5,832,211 | A | 11/1998 | Blakley, III et al. |
| 5,832,460 | A | 11/1998 | Bednar et al. |
| 5,832,463 | A | 11/1998 | Funk |
| 5,832,464 | A | 11/1998 | Houvener et al. |
| 5,832,476 | A | 11/1998 | Tada et al. |
| 5,835,087 | A | 11/1998 | Herz |
| 5,835,580 | A | 11/1998 | Fraser |
| 5,835,603 | A | 11/1998 | Coutts |
| 5,838,903 | A | 11/1998 | Blakely, III et al. |
| 5,838,906 | A | 11/1998 | Doyle et al. |
| 5,842,178 | A | 11/1998 | Giovannoli |
| 5,842,211 | A | 11/1998 | Horadan et al. |
| 5,844,553 | A | 12/1998 | Hao et al. |
| 5,845,259 | A | 12/1998 | West et al. |
| 5,845,260 | A | 12/1998 | Nakano et al. |
| 5,847,709 | A | 12/1998 | Card et al. |
| 5,848,143 | A | 12/1998 | Andrews |
| 5,848,190 | A | 12/1998 | Kleehammer et al. |
| 5,848,400 | A | 12/1998 | Chan |
| 5,848,427 | A | 12/1998 | Hyodo |
| 5,852,812 | A | 12/1998 | Reeder |
| 5,857,023 | A | 1/1999 | Demers et al. .................. 380/24 |
| 5,857,079 | A | 1/1999 | Claus et al. |
| 5,862,223 | A | 1/1999 | Walker et al. |
| 5,862,323 | A | 1/1999 | Blakley, III et al. |
| 5,864,830 | A | 1/1999 | Armetta et al. |
| 5,864,871 | A | 1/1999 | Kitain et al. |
| RE36,116 | E | 2/1999 | McCarthy ....................... 705/16 |
| 5,866,889 | A | 2/1999 | Weiss et al. |
| 5,870,456 | A | 2/1999 | Rogers |
| 5,870,718 | A | 2/1999 | Spector |
| 5,870,724 | A | 2/1999 | Lawlor et al. |
| 5,870,725 | A | 2/1999 | Belinger et al. |
| 5,870,743 | A | 2/1999 | Cohen et al. |
| 5,871,398 | A | 2/1999 | Schneier et al. |
| 5,873,072 | A | 2/1999 | Kight et al. |
| 5,873,096 | A | 2/1999 | Lim |
| 5,880,769 | A | 3/1999 | Nemirofsky et al. |
| 5,883,810 | A | 3/1999 | Franklin |
| 5,884,032 | A | 3/1999 | Bateman et al. |
| 5,884,270 | A | 3/1999 | Walker et al. |
| 5,884,272 | A | 3/1999 | Walker et al. |
| 5,884,274 | A | 3/1999 | Walker et al. |
| 5,884,288 | A * | 3/1999 | Chang et al. .................... 705/40 |
| 5,884,290 | A | 3/1999 | Smorodinsky et al. .......... 705/44 |
| 5,889,862 | A | 3/1999 | Ohta et al. ....................... 380/24 |
| 5,889,863 | A | 3/1999 | Weber |
| 5,892,900 | A | 4/1999 | Ginter et al. |
| 5,895,454 | A | 4/1999 | Harrington |
| 5,895,456 | A | 4/1999 | Beale et al. ...................... 705/39 |
| 5,897,621 | A | 4/1999 | Boesch et al. |
| 5,897,671 | A | 4/1999 | Newman et al. ................. 8/158 |
| 5,898,780 | A | 4/1999 | Liu et al. |
| 5,899,982 | A | 5/1999 | Randle |
| 5,902,983 | A | 5/1999 | Crevelt et al. .................. 235/380 |
| 5,903,878 | A | 5/1999 | Talati et al. |
| 5,903,880 | A | 5/1999 | Biffar ............................. 705/39 |
| 5,903,881 | A | 5/1999 | Schrader et al. |
| 5,905,976 | A | 5/1999 | Mjolsnes et al. ................ 705/39 |
| 5,909,486 | A | 6/1999 | Walker et al. |
| 5,910,988 | A | 6/1999 | Ballard |
| 5,913,202 | A | 6/1999 | Motoyama |
| 5,913,203 | A | 6/1999 | Wong et al. ..................... 705/39 |
| 5,914,472 | A | 6/1999 | Foladare et al. |
| 5,915,244 | A | 6/1999 | Jack et al. |
| 5,918,214 | A | 6/1999 | Perkowski |
| 5,918,217 | A | 6/1999 | Maggioncalda et al. |
| 5,918,239 | A | 6/1999 | Allen et al. |
| 5,920,847 | A | 7/1999 | Kolling et al. |
| 5,921,864 | A | 7/1999 | Walker et al. |
| 5,923,763 | A | 7/1999 | Walker et al. |
| 5,924,084 | A | 7/1999 | De Rooij ........................ 705/39 |
| 5,926,548 | A | 7/1999 | Okamoto ........................ 380/24 |
| 5,926,796 | A | 7/1999 | Walker et al. |
| 5,926,812 | A | 7/1999 | Hilsenrath et al. |
| 5,930,764 | A | 7/1999 | Melchione |
| 5,933,816 | A | 8/1999 | Zeanah et al. |
| 5,933,817 | A | 8/1999 | Hucal |
| 5,933,823 | A | 8/1999 | Cullen et al. |
| 5,933,827 | A | 8/1999 | Cole et al. |
| 5,937,394 | A | 8/1999 | Wong et al. ..................... 705/26 |
| 5,937,396 | A | 8/1999 | Konya |
| 5,940,812 | A | 8/1999 | Tengel et al. |
| 5,943,423 | A | 8/1999 | Muftic |
| 5,943,656 | A | 8/1999 | Crooks et al. |
| 5,944,824 | A | 8/1999 | He |
| 5,945,653 | A | 8/1999 | Walker et al. |
| 5,946,388 | A | 8/1999 | Walker et al. |
| 5,947,747 | A | 9/1999 | Walker et al. |
| 5,949,044 | A | 9/1999 | Walker et al. |
| 5,949,875 | A | 9/1999 | Walker et al. |
| 5,950,173 | A | 9/1999 | Perkowski |
| 5,950,174 | A | 9/1999 | Brendzel |
| 5,950,206 | A | 9/1999 | Krause |
| 5,952,638 | A | 9/1999 | Demers et al. |
| 5,952,639 | A | 9/1999 | Ohki |
| 5,952,641 | A | 9/1999 | Korshun |
| 5,953,710 | A | 9/1999 | Fleming |
| 5,956,695 | A | 9/1999 | Carrithers et al. |
| 5,956,700 | A * | 9/1999 | Landry ........................... 705/40 |
| 5,958,007 | A | 9/1999 | Lee et al. |
| 5,960,411 | A | 9/1999 | Hartman et al. |
| 5,961,593 | A | 10/1999 | Gabber et al. |
| 5,963,635 | A | 10/1999 | Szlam et al. |
| 5,963,647 | A * | 10/1999 | Downing et al. ............... 705/39 |
| 5,963,648 | A | 10/1999 | Rosen |
| 5,963,925 | A | 10/1999 | Kolling et al. |
| 5,963,952 | A | 10/1999 | Smith |
| 5,963,953 | A | 10/1999 | Cram et al. |
| 5,966,695 | A | 10/1999 | Melchione et al. |
| 5,966,698 | A | 10/1999 | Pollin |
| 5,966,699 | A | 10/1999 | Zandi |
| 5,967,896 | A | 10/1999 | Jorasch et al. |
| 5,969,318 | A | 10/1999 | Mackenthun |
| 5,970,143 | A | 10/1999 | Schneier et al. |
| 5,970,470 | A | 10/1999 | Walker et al. |
| 5,970,478 | A | 10/1999 | Walker et al. |
| 5,970,480 | A | 10/1999 | Kalina ............................ 705/37 |
| 5,970,482 | A | 10/1999 | Pham |
| 5,970,483 | A | 10/1999 | Evans |

(56) References Cited

U.S. PATENT DOCUMENTS

| | | | |
|---|---|---|---|
| 5,978,467 | A | 11/1999 | Walker et al. |
| 5,978,780 | A | 11/1999 | Watson |
| 5,983,196 | A | 11/1999 | Wendkos |
| 5,987,434 | A | 11/1999 | Libman |
| 5,987,454 | A | 11/1999 | Hobbs |
| 5,987,498 | A | 11/1999 | Athing et al. |
| 5,991,736 | A | 11/1999 | Ferguson et al. |
| 5,991,738 | A | 11/1999 | Ogram |
| 5,991,748 | A | 11/1999 | Taskett |
| 5,991,749 | A | 11/1999 | Morrill, Jr. |
| 5,991,751 | A | 11/1999 | Rivette et al. |
| 5,991,780 | A | 11/1999 | Rivette et al. |
| 5,995,626 | A | 11/1999 | Nishioka et al. ................ 380/25 |
| 5,995,948 | A | 11/1999 | Whitford et al. |
| 5,995,976 | A | 11/1999 | Walker et al. |
| 5,999,596 | A | 12/1999 | Walker et al. |
| 5,999,907 | A | 12/1999 | Donner |
| 5,999,971 | A | 12/1999 | Buckland |
| 6,000,033 | A | 12/1999 | Kelley et al. |
| 6,001,016 | A | 12/1999 | Walker et al. |
| 6,003,762 | A | 12/1999 | Hayashida |
| 6,003,764 | A | 12/1999 | De Rooij et al. |
| 6,005,939 | A | 12/1999 | Fortenberry et al. |
| 6,006,205 | A | 12/1999 | Loeb et al. |
| 6,006,249 | A | 12/1999 | Leong |
| 6,009,415 | A | 12/1999 | Shurling et al. |
| 6,009,442 | A | 12/1999 | Chen et al. |
| 6,010,067 | A | 1/2000 | Elbaum |
| 6,010,404 | A | 1/2000 | Walker et al. |
| 6,012,048 | A | 1/2000 | Gustin et al. |
| 6,012,088 | A | 1/2000 | Li et al. |
| 6,012,983 | A | 1/2000 | Walker et al. |
| 6,014,439 | A | 1/2000 | Walker et al. |
| 6,014,635 | A | 1/2000 | Harris et al. |
| 6,014,636 | A | 1/2000 | Reeder |
| 6,014,638 | A | 1/2000 | Burge et al. |
| 6,014,641 | A | 1/2000 | Loeb et al. |
| 6,014,645 | A | 1/2000 | Cunningham |
| 6,014,646 | A | 1/2000 | Vallee et al. |
| 6,016,476 | A | 1/2000 | Maes et al. |
| 6,016,484 | A | 1/2000 | Williams et al. |
| 6,016,810 | A | 1/2000 | Ravenscroft |
| 6,018,714 | A | 1/2000 | Risen, Jr. et al. |
| 6,018,718 | A | 1/2000 | Walker et al. |
| 6,021,202 | A | 2/2000 | Anderson et al. |
| 6,024,640 | A | 2/2000 | Walker et al. |
| 6,026,398 | A | 2/2000 | Brown et al. |
| 6,026,429 | A | 2/2000 | Jones et al. |
| 6,029,141 | A | 2/2000 | Bezos et al. |
| 6,032,133 | A * | 2/2000 | Hilt et al. ................ 705/40 |
| 6,032,134 | A | 2/2000 | Weissman |
| 6,032,135 | A | 2/2000 | Molano et al. |
| 6,032,136 | A | 2/2000 | Brake, Jr. et al. |
| 6,032,147 | A | 2/2000 | Williams et al. |
| 6,035,281 | A | 3/2000 | Crosskey et al. |
| 6,035,285 | A | 3/2000 | Schlect et al. |
| 6,038,547 | A | 3/2000 | Casto |
| 6,038,552 | A | 3/2000 | Fleischl et al. |
| 6,041,315 | A | 3/2000 | Pollin |
| 6,042,006 | A | 3/2000 | Van Tilburg et al. |
| 6,044,362 | A | 3/2000 | Neely |
| 6,045,039 | A | 4/2000 | Stinson et al. |
| 6,049,778 | A | 4/2000 | Walker et al. |
| 6,049,782 | A | 4/2000 | Gottesman et al. |
| 6,049,835 | A | 4/2000 | Gagnon |
| 6,052,672 | A | 4/2000 | Foster |
| 6,055,637 | A | 4/2000 | Hudson et al. |
| 6,058,381 | A | 5/2000 | Nelson |
| 6,061,665 | A | 5/2000 | Bahreman |
| 6,064,987 | A | 5/2000 | Walker et al. |
| 6,065,120 | A | 5/2000 | Laursen et al. |
| 6,065,675 | A | 5/2000 | Teicher |
| 6,067,531 | A | 5/2000 | Hoyt et al. |
| 6,070,147 | A | 5/2000 | Harms et al. |
| 6,070,150 | A | 5/2000 | Remington et al. |
| 6,070,153 | A | 5/2000 | Simpson ................ 705/36 |
| 6,070,244 | A | 5/2000 | Orchier et al. |
| 6,073,105 | A | 6/2000 | Sutcliffe et al. |
| 6,073,113 | A | 6/2000 | Guinan |
| 6,073,237 | A | 6/2000 | Ellison |
| 6,075,519 | A | 6/2000 | Okatani et al. |
| 6,076,072 | A | 6/2000 | Libman |
| 6,078,907 | A | 6/2000 | Lamm |
| 6,081,790 | A | 6/2000 | Rosen |
| 6,081,810 | A | 6/2000 | Rosenzweig et al. |
| 6,081,900 | A | 6/2000 | Subramaniam et al. |
| 6,085,168 | A | 7/2000 | Mori et al. |
| 6,088,444 | A | 7/2000 | Walker et al. |
| 6,088,451 | A | 7/2000 | He et al. |
| 6,088,683 | A | 7/2000 | Jalili |
| 6,088,686 | A | 7/2000 | Walker et al. |
| 6,088,700 | A | 7/2000 | Larsen et al. |
| 6,091,817 | A | 7/2000 | Bertina et al. |
| 6,092,053 | A | 7/2000 | Boesch et al. |
| 6,092,192 | A | 7/2000 | Kanevsky et al. |
| 6,092,196 | A | 7/2000 | Reiche |
| 6,095,412 | A | 8/2000 | Bertina et al. |
| 6,098,053 | A | 8/2000 | Slater |
| 6,098,070 | A | 8/2000 | Maxwell |
| 6,101,486 | A | 8/2000 | Roberts et al. |
| 6,104,716 | A | 8/2000 | Crichton et al. |
| 6,105,008 | A | 8/2000 | Davis et al. |
| 6,105,012 | A | 8/2000 | Chang et al. |
| 6,105,865 | A | 8/2000 | Hardesty |
| 6,111,858 | A | 8/2000 | Greaves et al. |
| 6,112,181 | A | 8/2000 | Shear et al. |
| 6,112,984 | A | 9/2000 | Snavely |
| 6,115,642 | A | 9/2000 | Brown et al. |
| 6,115,690 | A | 9/2000 | Wong |
| 6,119,093 | A | 9/2000 | Walker et al. |
| 6,119,099 | A | 9/2000 | Walker et al. |
| 6,119,106 | A | 9/2000 | Mersky et al. |
| 6,119,107 | A | 9/2000 | Polk |
| 6,125,185 | A | 9/2000 | Boesch |
| 6,128,599 | A | 10/2000 | Walker et al. |
| 6,128,602 | A | 10/2000 | Northington et al. |
| 6,128,603 | A | 10/2000 | Dent et al. |
| 6,131,810 | A | 10/2000 | Weiss et al. |
| 6,134,549 | A | 10/2000 | Regnier et al. |
| 6,134,592 | A | 10/2000 | Montulli |
| 6,135,349 | A | 10/2000 | Zirkel |
| 6,138,106 | A | 10/2000 | Walker et al. |
| 6,138,107 | A | 10/2000 | Elgamal |
| 6,138,118 | A | 10/2000 | Koppstein et al. |
| 6,141,651 | A | 10/2000 | Riley et al. |
| 6,141,666 | A | 10/2000 | Tobin |
| 6,144,946 | A | 11/2000 | Iwamura |
| 6,144,948 | A | 11/2000 | Walker et al. |
| 6,145,086 | A | 11/2000 | Bellemore et al. |
| 6,148,293 | A | 11/2000 | King |
| 6,149,055 | A | 11/2000 | Gatto |
| 6,151,584 | A | 11/2000 | Papierniak et al. |
| 6,154,750 | A | 11/2000 | Roberge et al. |
| 6,154,879 | A | 11/2000 | Pare, Jr. et al. |
| 6,161,113 | A | 12/2000 | Mora et al. |
| 6,161,182 | A | 12/2000 | Nadooshan |
| 6,164,533 | A | 12/2000 | Barton |
| 6,170,011 | B1 | 1/2001 | Beck et al. |
| 6,173,272 | B1 | 1/2001 | Thomas et al. |
| 6,175,823 | B1 | 1/2001 | Van Dusen ................ 705/26 |
| 6,178,511 | B1 | 1/2001 | Cohen et al. |
| 6,182,052 | B1 | 1/2001 | Fulton et al. |
| 6,182,142 | B1 | 1/2001 | Win et al. |
| 6,182,220 | B1 | 1/2001 | Chen et al. |
| 6,182,225 | B1 | 1/2001 | Hagiuda et al. |
| 6,185,242 | B1 | 2/2001 | Arthur et al. |
| 6,189,029 | B1 | 2/2001 | Fuerst |
| 6,189,785 | B1 * | 2/2001 | Lowery ................ 235/379 |
| 6,195,644 | B1 | 2/2001 | Bowie |
| 6,199,077 | B1 | 3/2001 | Inala et al. |
| 6,201,948 | B1 | 3/2001 | Cook et al. |
| 6,202,005 | B1 | 3/2001 | Mahaffey |
| 6,202,054 | B1 | 3/2001 | Lawlor et al. |
| 6,202,066 | B1 | 3/2001 | Barkley |

(56) References Cited

U.S. PATENT DOCUMENTS

| | | | |
|---|---|---|---|
| 6,202,151 B1 | 3/2001 | Musgrave et al. | |
| 6,202,158 B1 | 3/2001 | Urano et al. | |
| 6,205,433 B1 | 3/2001 | Boesch et al. | |
| 6,208,978 B1 | 3/2001 | Walker et al. | |
| 6,208,984 B1 | 3/2001 | Rosenthal | |
| 6,216,115 B1 | 4/2001 | Barrameda et al. | |
| 6,219,639 B1 | 4/2001 | Bakis et al. | |
| 6,219,706 B1 | 4/2001 | Fan et al. | |
| 6,222,914 B1 | 4/2001 | McMullin | |
| 6,223,168 B1 | 4/2001 | McGurl et al. | 705/40 |
| 6,223,983 B1 | 5/2001 | Kjonaas et al. | |
| 6,226,623 B1 | 5/2001 | Schein et al. | |
| 6,226,679 B1 | 5/2001 | Gupta | |
| 6,226,752 B1 | 5/2001 | Gupta et al. | |
| 6,227,447 B1 | 5/2001 | Campisano | |
| 6,230,148 B1 | 5/2001 | Pare, Jr. et al. | |
| 6,236,972 B1 | 5/2001 | Shkedy | |
| 6,243,688 B1 | 6/2001 | Kalina | |
| 6,243,816 B1 | 6/2001 | Fang et al. | |
| 6,246,996 B1 * | 6/2001 | Stein et al. | 705/26 |
| 6,253,327 B1 | 6/2001 | Zhang et al. | |
| 6,253,328 B1 | 6/2001 | Smith, Jr. | |
| 6,256,664 B1 | 7/2001 | Donoho et al. | |
| 6,260,026 B1 | 7/2001 | Tomida et al. | |
| 6,266,648 B1 | 7/2001 | Baker, III | |
| 6,266,683 B1 | 7/2001 | Yehuda et al. | |
| 6,267,292 B1 | 7/2001 | Walker et al. | |
| 6,269,348 B1 | 7/2001 | Pare, Jr. et al. | |
| 6,275,944 B1 | 8/2001 | Kao et al. | |
| 6,285,991 B1 | 9/2001 | Powar | |
| 6,289,322 B1 | 9/2001 | Kitchen et al. | |
| 6,292,789 B1 | 9/2001 | Schutzer | |
| 6,295,522 B1 | 9/2001 | Boesch | |
| 6,298,330 B1 | 10/2001 | Gardenswartz et al. | |
| 6,298,335 B1 | 10/2001 | Bernstein | |
| 6,298,356 B1 | 10/2001 | Jawahar et al. | |
| 6,301,567 B1 | 10/2001 | Leong et al. | |
| 6,304,857 B1 * | 10/2001 | Heindel et al. | 705/34 |
| 6,308,273 B1 | 10/2001 | Goertzel et al. | |
| 6,308,274 B1 | 10/2001 | Swift | |
| 6,311,170 B1 | 10/2001 | Embrey | |
| 6,311,275 B1 | 10/2001 | Jin et al. | |
| 6,317,834 B1 | 11/2001 | Gennaro et al. | |
| 6,317,838 B1 | 11/2001 | Baize | |
| 6,321,211 B1 | 11/2001 | Dodd | 705/14 |
| 6,324,524 B1 | 11/2001 | Lent et al. | |
| 6,327,573 B1 | 12/2001 | Walker et al. | |
| 6,327,578 B1 | 12/2001 | Linehan | |
| 6,330,543 B1 | 12/2001 | Kepecs | |
| 6,332,192 B1 | 12/2001 | Boroditisky et al. | |
| 6,336,104 B1 | 1/2002 | Walker et al. | |
| 6,339,423 B1 | 1/2002 | Sampson et al. | |
| 6,341,724 B2 | 1/2002 | Campisano | |
| 6,343,279 B1 | 1/2002 | Bissonette et al. | |
| 6,343,323 B1 | 1/2002 | Kalpio et al. | |
| 6,345,261 B1 | 2/2002 | Feidelson | |
| 6,349,242 B2 | 2/2002 | Mahaffey | |
| 6,349,336 B1 | 2/2002 | Sit et al. | |
| 6,354,491 B2 | 3/2002 | Nichols et al. | |
| 6,360,254 B1 | 3/2002 | Linden et al. | |
| 6,363,381 B1 | 3/2002 | Lee et al. | |
| 6,366,682 B1 | 4/2002 | Hoffman et al. | |
| 6,366,893 B2 | 4/2002 | Hannula et al. | |
| 6,370,514 B1 | 4/2002 | Messner | 705/14 |
| 6,381,587 B1 | 4/2002 | Guzelsu | |
| 6,385,591 B1 | 5/2002 | Mankoff | |
| 6,385,652 B1 | 5/2002 | Brown et al. | |
| 6,401,125 B1 | 6/2002 | Makarios et al. | |
| 6,401,206 B1 * | 6/2002 | Khan et al. | 713/176 |
| 6,401,211 B1 | 6/2002 | Brezak, Jr. et al. | |
| 6,408,389 B2 | 6/2002 | Grawrock et al. | |
| 6,411,933 B1 | 6/2002 | Maes et al. | |
| 6,418,457 B1 | 7/2002 | Schmidt et al. | |
| 6,434,159 B1 | 8/2002 | Woodward et al. | |
| 6,438,594 B1 | 8/2002 | Bowman-Amuah | |
| 6,438,666 B2 | 8/2002 | Cassagnol et al. | |
| 6,446,053 B1 | 9/2002 | Elliott | |
| 6,449,765 B1 | 9/2002 | Ballard | |
| 6,453,353 B1 | 9/2002 | Win et al. | |
| 6,460,141 B1 | 10/2002 | Olden | |
| 6,470,357 B1 | 10/2002 | Garcia, Jr. et al. | |
| 6,484,149 B1 | 11/2002 | Jammes | |
| 6,487,641 B1 | 11/2002 | Cusson et al. | |
| 6,490,568 B1 | 12/2002 | Omara et al. | |
| 6,490,601 B1 | 12/2002 | Markus et al. | |
| 6,493,677 B1 | 12/2002 | Von Rosen et al. | |
| 6,493,685 B1 | 12/2002 | Ensel et al. | |
| 6,496,855 B1 | 12/2002 | Hunt et al. | |
| 6,496,936 B1 | 12/2002 | French et al. | |
| 6,498,657 B1 | 12/2002 | Kuntz et al. | |
| 6,507,912 B1 | 1/2003 | Matyas, Jr. et al. | |
| 6,510,523 B1 | 1/2003 | Perlman et al. | |
| 6,519,763 B1 | 2/2003 | Kaufer et al. | |
| 6,526,404 B1 | 2/2003 | Slater et al. | |
| 6,532,284 B2 | 3/2003 | Walker et al. | |
| 6,535,855 B1 | 3/2003 | Cahill et al. | |
| 6,535,917 B1 | 3/2003 | Zamanzadeh et al. | |
| 6,535,980 B1 | 3/2003 | Kumar | |
| 6,539,424 B1 | 3/2003 | Dutta | |
| 6,554,184 B1 | 4/2003 | Amos | |
| 6,557,039 B1 | 4/2003 | Leong et al. | |
| 6,574,348 B1 | 6/2003 | Venkatesan et al. | |
| 6,578,015 B1 * | 6/2003 | Haseltine et al. | 705/34 |
| 6,580,814 B1 | 6/2003 | Ittycheriah et al. | |
| 6,581,040 B1 | 6/2003 | Wright et al. | |
| 6,584,505 B1 | 6/2003 | Howard et al. | |
| 6,584,508 B1 | 6/2003 | Epstein et al. | |
| 6,589,291 B1 | 7/2003 | Boag et al. | |
| 6,592,044 B1 | 7/2003 | Wong et al. | |
| 6,609,106 B1 | 8/2003 | Robertson | |
| 6,609,113 B1 | 8/2003 | O'Leary et al. | |
| 6,609,125 B1 | 8/2003 | Layne et al. | |
| 6,609,198 B1 | 8/2003 | Wood et al. | |
| 6,609,654 B1 | 8/2003 | Anderson et al. | |
| 6,615,190 B1 | 9/2003 | Slater | |
| 6,618,579 B1 | 9/2003 | Smith et al. | |
| 6,618,806 B1 | 9/2003 | Brown et al. | |
| 6,623,415 B2 | 9/2003 | Gates et al. | |
| 6,640,302 B1 | 10/2003 | Subramaniam et al. | |
| 6,668,322 B1 | 12/2003 | Wood et al. | |
| 6,671,818 B1 | 12/2003 | Mikurak | |
| 6,675,261 B2 | 1/2004 | Shandony | |
| 6,676,431 B2 | 1/2004 | Kukita et al. | |
| 6,678,664 B1 | 1/2004 | Ganesan | |
| 6,684,248 B1 * | 1/2004 | Janacek et al. | 709/225 |
| 6,684,384 B1 | 1/2004 | Bickerton et al. | |
| 6,687,222 B1 | 2/2004 | Albert et al. | |
| 6,687,245 B2 | 2/2004 | Fangman et al. | |
| 6,697,947 B1 | 2/2004 | Matyas, Jr. et al. | |
| 6,704,714 B1 | 3/2004 | O'Leary et al. | |
| 6,711,170 B1 | 3/2004 | Brown | |
| 6,714,987 B1 | 3/2004 | Amin et al. | |
| 6,718,482 B2 | 4/2004 | Sato et al. | |
| 6,718,535 B1 | 4/2004 | Underwood | |
| 6,725,269 B1 | 4/2004 | Megiddo | |
| 6,735,695 B1 | 5/2004 | Gopalakrishnan et al. | |
| 6,738,779 B1 | 5/2004 | Shapira | |
| 6,751,654 B2 | 6/2004 | Massarani et al. | |
| 6,754,833 B1 | 6/2004 | Black et al. | |
| 6,755,341 B1 | 6/2004 | Wong et al. | |
| 6,763,388 B1 | 7/2004 | Tsimelzon | |
| 6,766,370 B2 | 7/2004 | Glommen et al. | |
| 6,769,605 B1 | 8/2004 | Magness | |
| 6,772,146 B2 | 8/2004 | Khemlani et al. | |
| 6,785,810 B1 | 8/2004 | Lirov et al. | |
| 6,789,115 B1 | 9/2004 | Singer et al. | |
| 6,792,572 B1 | 9/2004 | Frohlick | |
| 6,805,288 B2 | 10/2004 | Routhenstein et al. | |
| 6,810,395 B1 | 10/2004 | Bharat | |
| 6,819,219 B1 | 11/2004 | Bolle et al. | |
| 6,820,202 B1 | 11/2004 | Wheeler et al. | |
| 6,826,696 B1 | 11/2004 | Chawla et al. | |
| 6,832,202 B1 | 12/2004 | Schuyler et al. | |
| 6,832,587 B2 | 12/2004 | Wampula et al. | |

(56) References Cited

U.S. PATENT DOCUMENTS

| | | | |
|---|---|---|---|
| 6,847,991 B1 | 1/2005 | Kurapati | |
| 6,856,970 B1 | 2/2005 | Campbell et al. | |
| 6,868,391 B1 | 3/2005 | Hultgren | |
| 6,892,187 B2 | 5/2005 | Phillips et al. | |
| 6,892,231 B2 | 5/2005 | Jager | |
| 6,907,566 B1 | 6/2005 | McElfresh et al. | |
| 6,925,481 B2 | 8/2005 | Singhal et al. | |
| 6,934,691 B1 * | 8/2005 | Simpson et al. | 705/34 |
| 6,934,848 B1 | 8/2005 | King et al. | |
| 6,937,976 B2 | 8/2005 | Apte | |
| 6,938,158 B2 | 8/2005 | Azuma | |
| 6,950,936 B2 | 9/2005 | Subramaniam et al. | |
| 6,954,932 B2 | 10/2005 | Nakamura et al. | |
| 6,957,337 B1 | 10/2005 | Chainer et al. | |
| 6,965,939 B2 | 11/2005 | Cuomo et al. | |
| 6,976,164 B1 | 12/2005 | King et al. | |
| 6,980,962 B1 | 12/2005 | Arganbright et al. | |
| 6,983,421 B1 | 1/2006 | Lahti et al. | |
| 6,992,786 B1 | 1/2006 | Breding et al. | |
| 6,999,943 B1 | 2/2006 | Johnson et al. | |
| 7,004,382 B2 | 2/2006 | Sandru | |
| 7,006,983 B1 | 2/2006 | Packes et al. | |
| 7,010,512 B1 | 3/2006 | Gillin et al. | |
| 7,020,696 B1 | 3/2006 | Perry et al. | |
| 7,031,939 B1 | 4/2006 | Gallagher et al. | |
| 7,032,110 B1 | 4/2006 | Su et al. | |
| 7,051,199 B1 | 5/2006 | Berson et al. | |
| 7,051,330 B1 | 5/2006 | Kaler et al. | |
| 7,058,817 B1 | 6/2006 | Ellmore | |
| 7,062,456 B1 | 6/2006 | Riehl et al. | |
| 7,062,462 B1 | 6/2006 | Ireland et al. | |
| 7,068,832 B1 | 6/2006 | Price et al. | |
| 7,076,453 B2 | 7/2006 | Jammes et al. | |
| 7,080,036 B1 | 7/2006 | Drummond et al. | |
| 7,089,203 B1 | 8/2006 | Crookshanks | |
| 7,089,208 B1 * | 8/2006 | Levchin et al. | 705/39 |
| 7,089,503 B1 | 8/2006 | Bloomquist et al. | |
| 7,093,020 B1 | 8/2006 | McCarty et al. | |
| 7,093,282 B2 | 8/2006 | Hillhouse | |
| 7,103,556 B2 | 9/2006 | Del Rey et al. | |
| 7,104,443 B1 | 9/2006 | Paul et al. | |
| 7,117,239 B1 | 10/2006 | Hansen | |
| 7,124,101 B1 | 10/2006 | Mikurak | |
| 7,134,075 B2 | 11/2006 | Hind | |
| 7,137,006 B1 | 11/2006 | Grandcolas et al. | |
| 7,139,686 B1 | 11/2006 | Critz | |
| 7,146,344 B2 | 12/2006 | Wankmueller | |
| 7,165,049 B2 | 1/2007 | Slater | |
| 7,171,388 B2 | 1/2007 | Phillips et al. | |
| 7,174,315 B2 | 2/2007 | Phillips et al. | |
| 7,174,316 B2 | 2/2007 | Phillips et al. | |
| 7,174,317 B2 | 2/2007 | Phillips et al. | |
| 7,177,836 B1 | 2/2007 | German et al. | |
| 7,185,094 B2 | 2/2007 | Marquette et al. | |
| 7,188,181 B1 | 3/2007 | Squier et al. | |
| 7,194,437 B1 * | 3/2007 | Britto et al. | 705/40 |
| 7,197,470 B1 | 3/2007 | Arnett | |
| 7,200,566 B1 | 4/2007 | Moore et al. | |
| 7,203,909 B1 | 4/2007 | Horvitz et al. | |
| 7,299,201 B2 | 11/2007 | Jammes | |
| 7,321,864 B1 | 1/2008 | Gendler | |
| 7,321,875 B2 | 1/2008 | Dilip et al. | |
| 7,337,148 B2 | 2/2008 | Xie et al. | |
| 7,356,837 B2 | 4/2008 | Asghari-Kamrani et al. | |
| 7,370,011 B2 | 5/2008 | Bennett et al. | |
| 7,398,253 B1 | 7/2008 | Pinnell | |
| 7,440,923 B1 | 10/2008 | Compiano | |
| 7,471,818 B1 | 12/2008 | Price et al. | |
| 7,483,845 B2 | 1/2009 | Vetelainen | |
| 7,519,560 B2 | 4/2009 | Lam et al. | |
| 7,546,254 B2 | 6/2009 | Bednarek | |
| 7,555,444 B1 | 6/2009 | Wilson et al. | |
| 7,565,353 B2 | 7/2009 | Gatto et al. | |
| 7,587,363 B2 | 9/2009 | Cataline et al. | |
| 7,599,877 B1 | 10/2009 | Cole et al. | |
| 7,603,335 B2 | 10/2009 | Sakoh et al. | |
| 7,613,656 B2 | 11/2009 | Stanley et al. | |
| 7,627,310 B2 | 12/2009 | Starr et al. | |
| 7,627,608 B2 | 12/2009 | Strandell et al. | |
| 7,657,489 B2 | 2/2010 | Stambaugh | |
| 7,668,363 B2 | 2/2010 | Price et al. | |
| 7,676,431 B2 | 3/2010 | O'Leary et al. | |
| 7,680,738 B2 | 3/2010 | Amann et al. | |
| 7,693,752 B2 | 4/2010 | Jaramillo | |
| 7,708,202 B2 | 5/2010 | Hawkins | |
| 7,747,463 B1 | 6/2010 | Phillips et al. | |
| 7,774,231 B2 | 8/2010 | Pond et al. | |
| 7,792,717 B1 | 9/2010 | Hankins et al. | |
| 7,801,814 B2 | 9/2010 | Cataline et al. | |
| 7,805,365 B1 | 9/2010 | Slavin et al. | |
| 7,805,368 B2 | 9/2010 | Phillips et al. | |
| 7,809,636 B1 | 10/2010 | Jou et al. | |
| 7,809,643 B2 | 10/2010 | Phillips et al. | |
| 7,813,955 B2 | 10/2010 | Ariff et al. | |
| 7,818,253 B2 | 10/2010 | Phillips et al. | |
| 7,822,688 B2 | 10/2010 | Labrou et al. | |
| 7,831,490 B2 | 11/2010 | Modigliani et al. | |
| 7,856,377 B2 | 12/2010 | Cohagan et al. | |
| 7,886,964 B2 | 2/2011 | Steinecker | |
| 7,899,706 B1 | 3/2011 | Stone et al. | |
| 7,908,170 B2 | 3/2011 | Asmar et al. | |
| 7,945,479 B2 | 5/2011 | Asher et al. | |
| 7,962,409 B2 | 6/2011 | O'Leary et al. | |
| 7,970,706 B2 | 6/2011 | Keene | |
| 7,974,889 B2 | 7/2011 | Raimbeault | |
| 7,992,781 B2 | 8/2011 | Hammad | |
| 7,996,252 B2 | 8/2011 | Shahrabi et al. | |
| 8,000,749 B1 | 8/2011 | McConnell et al. | |
| 8,005,756 B2 | 8/2011 | Phillips et al. | |
| 8,014,755 B2 | 9/2011 | Sun et al. | |
| 8,019,365 B2 | 9/2011 | Fisher | |
| 8,024,220 B2 | 9/2011 | Ariff et al. | |
| 8,027,891 B2 | 9/2011 | Preston et al. | |
| 8,045,784 B2 | 10/2011 | Price et al. | |
| 8,121,944 B2 | 2/2012 | Norman | |
| 8,165,381 B1 | 4/2012 | Farris | |
| 8,175,967 B2 | 5/2012 | O'Leary et al. | |
| 8,175,968 B2 | 5/2012 | O'Leary et al. | |
| 8,190,521 B2 | 5/2012 | O'Leary et al. | |
| 8,255,319 B1 | 8/2012 | Hong et al. | |
| 8,285,641 B2 | 10/2012 | Cataline et al. | |
| 8,290,862 B2 | 10/2012 | Sheehan et al. | |
| 8,290,863 B2 | 10/2012 | Sheehan et al. | |
| 2001/0011255 A1 | 8/2001 | Asay et al. | |
| 2001/0012974 A1 | 8/2001 | Mahaffey | |
| 2001/0016835 A1 | 8/2001 | Hansmann et al. | |
| 2001/0018666 A1 | 8/2001 | Sugiyama et al. | |
| 2001/0027474 A1 | 10/2001 | Nachman et al. | |
| 2001/0029464 A1 | 10/2001 | Schweitzwer | |
| 2001/0032139 A1 | 10/2001 | Debonnett, Jr. | |
| 2001/0032184 A1 | 10/2001 | Tenembaum | |
| 2001/0037300 A1 | 11/2001 | Miyazaki et al. | |
| 2001/0047295 A1 | 11/2001 | Tenembaum | |
| 2001/0047334 A1 | 11/2001 | Nappe et al. | |
| 2001/0047489 A1 | 11/2001 | Ito et al. | |
| 2001/0051917 A1 | 12/2001 | Bissonette et al. | |
| 2001/0054003 A1 | 12/2001 | Chien et al. | |
| 2001/0054059 A1 | 12/2001 | Marks et al. | |
| 2002/0002479 A1 | 1/2002 | Almog et al. | |
| 2002/0007313 A1 | 1/2002 | Mai et al. | |
| 2002/0007460 A1 | 1/2002 | Azuma | |
| 2002/0010599 A1 | 1/2002 | Levinson | |
| 2002/0010668 A1 | 1/2002 | Travis et al. | |
| 2002/0013728 A1 | 1/2002 | Wilkman | |
| 2002/0016769 A1 | 2/2002 | Barbara et al. | |
| 2002/0018585 A1 | 2/2002 | Kim | |
| 2002/0019938 A1 | 2/2002 | Aarons | |
| 2002/0023026 A1 | 2/2002 | Carroll et al. | 705/26 |
| 2002/0023055 A1 | 2/2002 | Antognini et al. | |
| 2002/0023108 A1 | 2/2002 | Daswani et al. | |
| 2002/0029269 A1 | 3/2002 | McCarty et al. | |
| 2002/0032613 A1 | 3/2002 | Buettgenbach et al. | |
| 2002/0032650 A1 | 3/2002 | Hauser et al. | |
| 2002/0038363 A1 | 3/2002 | MacLean | |

(56) References Cited

U.S. PATENT DOCUMENTS

| | | |
|---|---|---|
| 2002/0046169 A1 | 4/2002 | Keresman, III et al. |
| 2002/0052842 A1 | 5/2002 | Schuba et al. |
| 2002/0052845 A1 | 5/2002 | Nielsen |
| 2002/0055907 A1 | 5/2002 | Pater et al. |
| 2002/0059141 A1 | 5/2002 | Davies et al. |
| 2002/0062282 A1 | 5/2002 | Kight et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0082962 A1 | 6/2002 | Farris et al. |
| 2002/0087447 A1 | 7/2002 | McDonald et al. |
| 2002/0087468 A1 | 7/2002 | Ganesan et al. |
| 2002/0087469 A1 | 7/2002 | Ganesan et al. |
| 2002/0087471 A1 | 7/2002 | Ganesan et al. |
| 2002/0091635 A1 | 7/2002 | Dilip et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0116331 A1 | 8/2002 | Cataline et al. |
| 2002/0128968 A1* | 9/2002 | Kitchen et al. ................ 705/40 |
| 2002/0128981 A1 | 9/2002 | Kawan et al. |
| 2002/0143874 A1 | 10/2002 | Marquette et al. |
| 2002/0152163 A1 | 10/2002 | Bezos et al. |
| 2002/0156723 A1 | 10/2002 | Lilly et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023549 A1 | 1/2003 | Armes et al. |
| 2003/0023880 A1 | 1/2003 | Edwards et al. |
| 2003/0033257 A1 | 2/2003 | Wankmueller |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0046591 A1 | 3/2003 | Asghari-Kamrani et al. |
| 2003/0051026 A1 | 3/2003 | Carter et al. |
| 2003/0055871 A1 | 3/2003 | Roses |
| 2003/0061157 A1 | 3/2003 | Hirka et al. |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0120686 A1 | 6/2003 | Kim et al. |
| 2003/0130945 A1 | 7/2003 | Force et al. |
| 2003/0140004 A1* | 7/2003 | O'Leary et al. ................ 705/39 |
| 2003/0149594 A1 | 8/2003 | Beazley et al. |
| 2003/0154171 A1 | 8/2003 | Karp et al. |
| 2003/0154403 A1 | 8/2003 | Keinsley |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0191701 A1* | 10/2003 | Haseltine et al. ................ 705/34 |
| 2003/0204460 A1 | 10/2003 | Robinson et al. |
| 2003/0208421 A1 | 11/2003 | Vicknair et al. |
| 2003/0208441 A1 | 11/2003 | Poplawski et al. |
| 2003/0216990 A1* | 11/2003 | Star ................ 705/35 |
| 2003/0225688 A1 | 12/2003 | Dobbins |
| 2004/0031856 A1 | 2/2004 | Atsmon et al. |
| 2004/0049702 A1 | 3/2004 | Subramaniam et al. |
| 2004/0064409 A1 | 4/2004 | Kight et al. |
| 2004/0078328 A1 | 4/2004 | Talbert et al. |
| 2004/0083167 A1* | 4/2004 | Kight et al. ................ 705/40 |
| 2004/0117409 A1 | 6/2004 | Scahill et al. |
| 2004/0153378 A1 | 8/2004 | Perkowski |
| 2004/0158522 A1 | 8/2004 | Brown et al. |
| 2004/0215514 A1 | 10/2004 | Quinlan |
| 2004/0254954 A1 | 12/2004 | Gatto et al. |
| 2004/0254991 A1 | 12/2004 | Malik et al. |
| 2004/0267688 A1 | 12/2004 | Vetelainen |
| 2005/0033690 A1 | 2/2005 | Antognini et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0203844 A1* | 9/2005 | Ferguson et al. ................ 705/40 |
| 2005/0209965 A1* | 9/2005 | Ganesan ................ 705/40 |
| 2005/0273347 A1 | 12/2005 | Dudley et al. |
| 2005/0278641 A1 | 12/2005 | Mansour et al. |
| 2006/0006224 A1 | 1/2006 | Modi |
| 2006/0029261 A1 | 2/2006 | Hoffman et al. |
| 2006/0106717 A1 | 5/2006 | Randle et al. |
| 2006/0116949 A1 | 6/2006 | Wehunt et al. |
| 2006/0178986 A1 | 8/2006 | Giordano et al. |
| 2006/0212391 A1 | 9/2006 | Norman et al. |
| 2006/0274970 A1 | 12/2006 | Seki et al. |
| 2006/0282389 A1 | 12/2006 | Gupte |
| 2007/0033192 A1 | 2/2007 | Sakoh et al. |
| 2007/0043683 A1 | 2/2007 | Hu |
| 2007/0055625 A1 | 3/2007 | Sheehan et al. |
| 2007/0198411 A1 | 8/2007 | Kavanagh et al. |
| 2008/0005021 A1 | 1/2008 | Brown et al. |
| 2008/0027860 A1 | 1/2008 | Mullen et al. |
| 2008/0040249 A1 | 2/2008 | Re et al. |
| 2008/0147525 A1 | 6/2008 | Allen et al. |
| 2008/0189293 A1 | 8/2008 | Strandel et al. |
| 2008/0270304 A1 | 10/2008 | Brown |
| 2009/0094124 A1 | 4/2009 | Foss |
| 2009/0210886 A1 | 8/2009 | Bhojwani et al. |
| 2009/0240624 A1 | 9/2009 | James et al. |
| 2009/0265245 A1 | 10/2009 | Wright |
| 2010/0161485 A1 | 6/2010 | Bulawa et al. |
| 2010/0250375 A1 | 9/2010 | Diehl |
| 2010/0299212 A1 | 11/2010 | Graylin et al. |
| 2011/0082772 A1 | 4/2011 | Hirson |
| 2011/0087595 A1 | 4/2011 | Sabella |
| 2011/0106635 A1 | 5/2011 | Khan et al. |
| 2011/0112866 A1 | 5/2011 | Gerrans |
| 2011/0112898 A1 | 5/2011 | White |
| 2011/0153403 A1 | 6/2011 | Postrel |
| 2011/0208589 A1 | 8/2011 | Garg |
| 2011/0238471 A1 | 9/2011 | Trzcinski |

FOREIGN PATENT DOCUMENTS

| | | |
|---|---|---|
| DE | 19731293 | 1/1999 |
| EP | 0 421 808 | 4/1991 |
| EP | 0542298 | 5/1993 |
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| FR | 2714749 | 7/1995 |
| GB | 2 328 532 | 2/1999 |
| GB | 2 368 147 | 4/2002 |
| JP | 07-131502 | 5/1995 |

(56) References Cited

FOREIGN PATENT DOCUMENTS

| | | |
|---|---|---|
| JP | 9-504634 | 5/1997 |
| JP | H10-187467 | 7/1998 |
| JP | 11102404 | 4/1999 |
| JP | 2000-504449 | 4/2000 |
| JP | 200324329 | 11/2000 |
| JP | 2001134672 | 5/2001 |
| JP | 2005-242976 | 9/2005 |
| WO | 91/16691 | 10/1991 |
| WO | 93/08545 | 4/1993 |
| WO | 94/04979 | 3/1994 |
| WO | 95/12859 | 5/1995 |
| WO | 95/19010 | 7/1995 |
| WO | 96/31965 | 10/1996 |
| WO | 97/39415 | 10/1997 |
| WO | 97/41498 | 11/1997 |
| WO | WO 97/43736 | 11/1997 |
| WO | 97/45814 | 12/1997 |
| WO | 98/09260 | 3/1998 |
| WO | 98/15925 | 4/1998 |
| WO | 98/18095 | 4/1998 |
| WO | 98/37524 | 8/1998 |
| WO | 98/38562 | 9/1998 |
| WO | 99/10823 | 3/1999 |
| WO | 99/12321 | 3/1999 |
| WO | 99/18529 | 4/1999 |
| WO | 99/24921 | 5/1999 |
| WO | 99/30263 | 6/1999 |
| WO | 99/40507 A1 | 8/1999 |
| WO | WO 99/40507 A1 | 8/1999 |
| WO | 99/52051 | 10/1999 |
| WO | WO 99/52051 | 10/1999 |
| WO | 00/28462 | 5/2000 |
| WO | 00/67177 | 11/2000 |
| WO | WO 00/68858 | 11/2000 |
| WO | 01/06427 | 1/2001 |
| WO | WO 01/18656 A1 | 3/2001 |
| WO | WO 01/35355 | 5/2001 |
| WO | WO 01/43084 | 6/2001 |
| WO | WO 0188659 | 11/2001 |
| WO | WO 01088659 | 11/2001 |
| WO | WO 02/17082 A1 | 2/2002 |
| WO | 02/37386 | 5/2002 |
| WO | 02/063432 | 8/2002 |
| WO | 03/038554 | 5/2003 |
| WO | 03/050649 | 6/2003 |
| WO | 2004/047079 | 6/2004 |
| WO | 2004/078710 | 9/2004 |
| WO | 2004/079603 | 9/2004 |
| WO | WO 2004/079603 | 9/2004 |
| WO | 2006/094410 | 9/2006 |
| WO | 2007/139867 | 6/2007 |
| WO | 2008/009052 | 1/2008 |
| WO | 2008/045783 | 4/2008 |
| WO | 2009/009451 | 1/2009 |

OTHER PUBLICATIONS

Kutler, A Different Drummer on the Data Highway, American Banker, Section: No. 91, vol. 160, May 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 08877661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Fusaro, Roberta, Builders Moving to Web tools Computerworld, Nov. 16, 1998, vol. 32, No. 46, pp. 51, 53.
Anonymous, CORBA Overview, arch2.htm at pent2l.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Larsen, Amy, Internet goes to Work for Builders, InterWeek, Nov. 16, 1998, Issue 741.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun.com, 05/32/1999.
JAVA, JAVA(TM) Servlet API, java.sun.com, May 21, 1999.
Frank, John N. Frank, Beyond Direct Mail, Credit Card Management, vol. 9, Iss. 5, Aug. 1996, 4pgs.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.

(56) References Cited

OTHER PUBLICATIONS

Sirbu, et al, NetBill: An Internet Commerce System Optimized for Network Delivered Services, printed on Feb. 27, 1995.
Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Thomas Publishing Company, SoluSource: For Engineers by Engineers, Thomas Publishing Company, Apr. 26, 1999.
JAVA, Staying in Touch with JNDI, java.sun.com, May 21, 1999.
Summary of the At Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, Order 93A 60636, Mar. 1, 1993, pp. 451-454.
Cotts, David, The Facility Management Handbook Second Edition AMACM, 1998, ISBN: 0/8144-030-8.
JAVA, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, Mar. 1, 1995.
Thomas Publishing Company, ThomasNet, Apr. 26, 1999.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
Anonymous, CORBA Overview, arch2.htm at pent21.intosys.tuwien.ac.at, May 25, 1999.
Cotts, David, The Facility Management Handbook Second Edition AMACM, 1998, ISBN: 0-8144-030-8.
Kutler, A Different Drummer on the Data Highway, American Banker, May 12, 1995, 2 pages.
Epper, A Player Goes After Big Bucks in Cyberspace, American Banker, May 5, 1995, 1 page.
Berry et al., A Potent New Tool for Selling Database, Cover Story, Business Week, Sep. 5, 1994, pp. 56-62.
Applets: The Source for JAVA Technology, JAVA, May 21, 1999, 2 pages.
Associates National Bank (DE) Credit Card Services, The Associates, www.theassocitheassociates.atescomcorn/consumer/credit_cards/rnain.html, Apr. 6, 1999, 6 pages.
At Your Request, Wingspanbankcom, Sep. 28, 1999, 1 page.
Aversion Therapy: Banks Overcoming Fear of the Net to Develop Safe Internet-based Payment System w/ Netscape Communicator, Network World, Dec. 12, 1994, 1 page.
JAVA, Banking on JAVA™ Technology, java.sun.com, May 21, 1999, 7 pages.
Bechtel Construction Operations Incorporated Standardizes on Primavera's Expedition Contract Management Software, Business Wire, Business Editors/Hi-Tech Writers, New York, Jul. 27, 1999, p. 1.
Vandenengel, Cards on the Internet: Advertising on a $3 Bill, Industry Intelligence, Feb. 1, 1995, 3 pages.
Kutler, Cash Card Creator Looking Beyond Mondex, Feb. 9, 1995, 1 page.
Bank, Cash, Check, Charge—What's Next?, Seattle Times, Mar. 6, 1998, 4 pages.
Consortium Created to Manage Common Electronic Purse Specifications, Visa, http://www.visa.com/av/news/PRmisco051199.vhtml, printed Feb. 23, 2001.
Marchman, Construction Scheduling with Primavera Project Planner.
Civitello, Jr., et al., Construction Operations Manual of Policies and Procedures, Third Edition, 2000.
Overview of CORBA, www.omg.com, May 25, 1999, 4 pages.
Chester, Cross-platform integration with XML and SOAP, Oct. 2001.
Mitchell, Cyberspace: Crafting software that will let you build a business out there, Business Week, pp. 78-86, Feb. 27, 1995.
Strassel, Dutch Software Concern Experiments with Electronic 'Cash' in Cyberspace, Wall Street Journal, Apr. 17, 1995, 1 page.
Post, E-Cash: Can't Live With It, Can't Live Without It, The American Lawyer, pp. 116-117, Mar. 1, 1996.
eCharge, eCharge Corporation, www.echarge.com, Dec. 3, 1999, 12 pages.
Thomas, Enterprise JAVABEANS™ Technology: Server Component Model for the Java™ platform, java.sun.com, May 21, 1999, 30 pages.
Maize, Fannie Mae on the Web, Newsbyte, May 8, 1995, 1 page.
FreeMarkets, FreeMarkets Online, Inc., Apr. 26, 1999, 35 pages.
The Gale Group, G&D America's Multi-application Smart Card Selected for Combined Payroll and 'Virtual Banking' Program in

(56) References Cited

OTHER PUBLICATIONS

Mexico, Business Wire, wysiwyg://0/http://www.dialogclassic.com/history, Apr. 24, 1998, p. 4241047, 3 pages.
Getting Smart with Java: Sun Micro Says American Express to Use Java for Smart Card, Reuters, www.abcnew.go.com/sciences/tech, Jun. 6, 2000, 2 pages.
Getting Started: Specific GE TPN Post Service Use Guidelines, GE, Apr. 26, 1999, 18 pages.
Harris InfoSource, Apr. 26, 1999, 12 pages.
Knowles, Improved Internet Security Enabling On-Line Commerce, PC Week, Mar. 20, 1995, 4 pages.
Meredith, Internet bank moves closer to virtual reality, USA Today, May 5, 1995, 1 page.
JAVA™ Technology in the Real World, JAVA, java.sun.com, May 21, 1999, 7 pages.
JAVA™ Remote Method Invocation (RMI) Interface, JAVA, java.sun.com, May 21, 1999, 16 pages.
JAVA™ Servlet API, JAVA, java.sun.com, May 21, 1999, 5 pages.
OMG, Library, www.omg.com, May 25, 1999, 5 pages.
Method of Protecting Data on a Personal Computer, IBM Technical Disclosure TDB 11-85, Order 85A 62426; p. 2530, Nov. 1, 1985.
Clark, Microsoft, Visa to Jointly Develop PC Electronic-Shopping Software, The Wall Street Journal, B9, Nov. 9, 1994, 3 pages.
Sirbu et al., NetBill: An Internet Commerce System Optimized for Network Delivered Services, http://www.ini.cmu.edu :80/netbill, pp. 1-12, Feb. 27, 1995, 12 pages.
Mitchell, Netlink Goes After an Unbanked Niche, wysiwyg://0/http://www.dialogclassic.com/history, ISSN: 1093-1279, Sep. 1999.
Barnham, Network Brings Together Producers and Companies, Bests Review Feb. 1, 1994, 1 page.
Houlder, OFT Gives the Individual Top Priority: Report Calls for Deregulation of Business Lending, The Financial Times, Jun. 8, 1994, 1 page.
CORBA Overview, May 25, 1999, 14 pages.
Harris, Planning Using Primavera Project Planner P3 Version 3.0, Users Guide, 1999.
Johnston, Pondering Passport: Do You Trust Microsoft With Your Data?, www.pcworld.com/resource/printable/article/0.aid,63244,00, asp, Sep. 24, 2001.
Primavera and PurchasePro.com to Create E-Commerce Marketplace for Construction Industry, Primavera Ships P3, Version 3.0, Press Release, Sep. 21, 1999.
Primavera How the World Manages Projects, Expedition Contract Control Software, www.primavera.com, Jun. 23, 3005.
Product Data Integration Technologies, Inc., PDIT, Apr. 26, 1999, 19 pages.
Resource Center: Consolidated Edison Selects GE TPN Post, GE, Apr. 26, 1999, 9 pages.
Kormann, Risks of the Passport Single Signon Protocol, Computer Networks, Elsevier Science Press, vol. 33, pp. 51-58, Jun. 22, 2005.
Safe Single-Sign-On Protocol with Minimal Password Exposure No Decryption and Technology Adaptivity, IBM Corporation, IBM Technical Disclosure, TDB, Order 95A, pp. 245-248, Mar. 1, 1995.
SBA: Pro-Net, SBA, Apr. 1, 1999, 11 pages.
Servelet/Applet/HTML.Authentication Process with Single Sign-On, IBM Corporation, IBM Order 00A60004, Jan. 1, 2000.
Schema for Representing CORBA Objects in an LDAP directory, Sun MicroSystems, Inc., May 21, 1999, 9 pages.
Jakobsson et al., Secure and lightweight advertising on the web, Computer Networks, 31 (1999), 1101-1109.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999, 29 pages.
SmartAxis, Load Cash on to Your E-Purse Card, Supported Currencies and Schemems, http://www.smartaxis.co.uk/seller/howitworks.html, printed Feb. 23, 2001.
Jepsen, SOAP Cleans up interoperability problems on the web, Jan. 2001.
SoluSource: For Engineers by Engineers, Thomas Publishing Company, Apr. 26, 1999, 10 pages.
JAVA, Staying in Touch with JNDI, java.sun.com, May 21, 1999, 8 pages.
Pletz et al., Summary of the at your risk architecture, Jun. 3, 1999, 8 pages.
Temporary Global Passwords, IBM Corporation, IBM Technical Disclosure TDB vol. 36, No. 3, Order 93A 60636 03-93, pp. 451-454, Mar. 1, 1993.
The check is in the email., Information Today, vol. 12, No. 3, Mar. 1, 1995, ISSN: 8755-6286, 4 pages.
JAVA, The JDBC™ Data Access API, java.sun.com, May 21, 1999, 3 pages.
ThomasNet, Thomas Publishing Company, Apr. 26, 1999, 9 pages.
RITZ, Total Construction Project Management, McGraw-Hill, 1994.
Understanding Product Data Management, Hewlett-Packard Company, Apr. 26, 1999, 9 pages.
Welcome to MUSE, MUSE Technologies, Apr. 26, 1999, 28 pages.
Welcome to OMG's CORBA for Beginners Page 49, OMG, www.omg.com, May 25, 1999, 4 pages.
What is CORBA?, OMG, www.omg.com, May 25, 1999, 2 page.
Fujimura et al., XML Voucher: Generic Voucher Language, Internet Draft, Trade Working Group, www.ietf.org, Feb. 2003.
Information Technologies for the Control of Money Laundering, Sep. 1995.
Michele Marrinan "First Union, Open Market Hit the Internet," Bank Systems & Technology, vol. 32, No. 5, pp. 6,8,10, (1995).
Sumitomo Bank Co., Ltd. Product Brochure "Sumitomo's receipt of money verification service" (Mar. 1999).
Credit Card News, "Fidelity Forges a Link Between Mutual Funds and Credit Cards," Jun. 1, 1994.
Fickenscher, L., American Banker, vol. CLXIII, No. 32, p. 15, "N. J. Bank to offer Card That Boosts College Savings," Jul. 14, 1998.
Kane, L., Medical Economics, vol. 74, No. 22, pp. 36-41, "10 Simple Rules for Successful Investing," Nov. 10, 1997.
Laing, R. Finance Week, pp. 80-81, "Cybermall Rats," Oct. 16, 1998.
eMoneyMail, www.emoneymail.com, 2000.
Gilbert, et al. "Creating and Integrated Payment System: The Evolution of Fedwire," FRBNY Economic Policy Review, Jul. 2007.

\* cited by examiner

Fig 11

SENDER – IDENTIFICATION INFORMATION

| | |
|---|---|
| First Name | 108 |
| Middle Name | 110 |
| Last Name | 112 |
| Suffix | 114 (optional) |
| E-Mail Address | 116 |
| Login Name | 118 |
| Password | 120 |
| Password Hint | 122 (optional) |

BANK – CUSTOMER INFORMATION

| | |
|---|---|
| Bank Card Number | 128 |
| PIN | 130 |
| Social Security Number | 132 |

BANK – NONCUSTOMER INFORMATION

| | |
|---|---|
| Social Security Number | 142 |
| City | 144 |
| State | 146 |
| Zip Code | 148 |
| Driver's Lic/State I.D. Number | 150 |
| Driver's License State | 152 |
| Date of Birth | 154 |

SEND – TRANSACTION INFORMATION

| | |
|---|---|
| Receiver's Name | 160 |
| Receiver's E-Mail Address | 162 |
| Challenge Question | 164 |
| Expected Challenge Response | 166 |
| Amount of Money Sending | 170 |
| E-Mail Subject | 172 |
| E-Mail Message | 174 (optional) |

CREDIT CARD INFORMATION

| Credit Card Account Number | 178 |
|---|---|
| Expiration Date | 180 |
| Card Verification Value (CVV) | 182 |
| First Name | 184 |
| Last Name | 186 |
| Street Address | 188 |
| City | 190 |
| State | 192 |
| Zip Code | 194 |

176

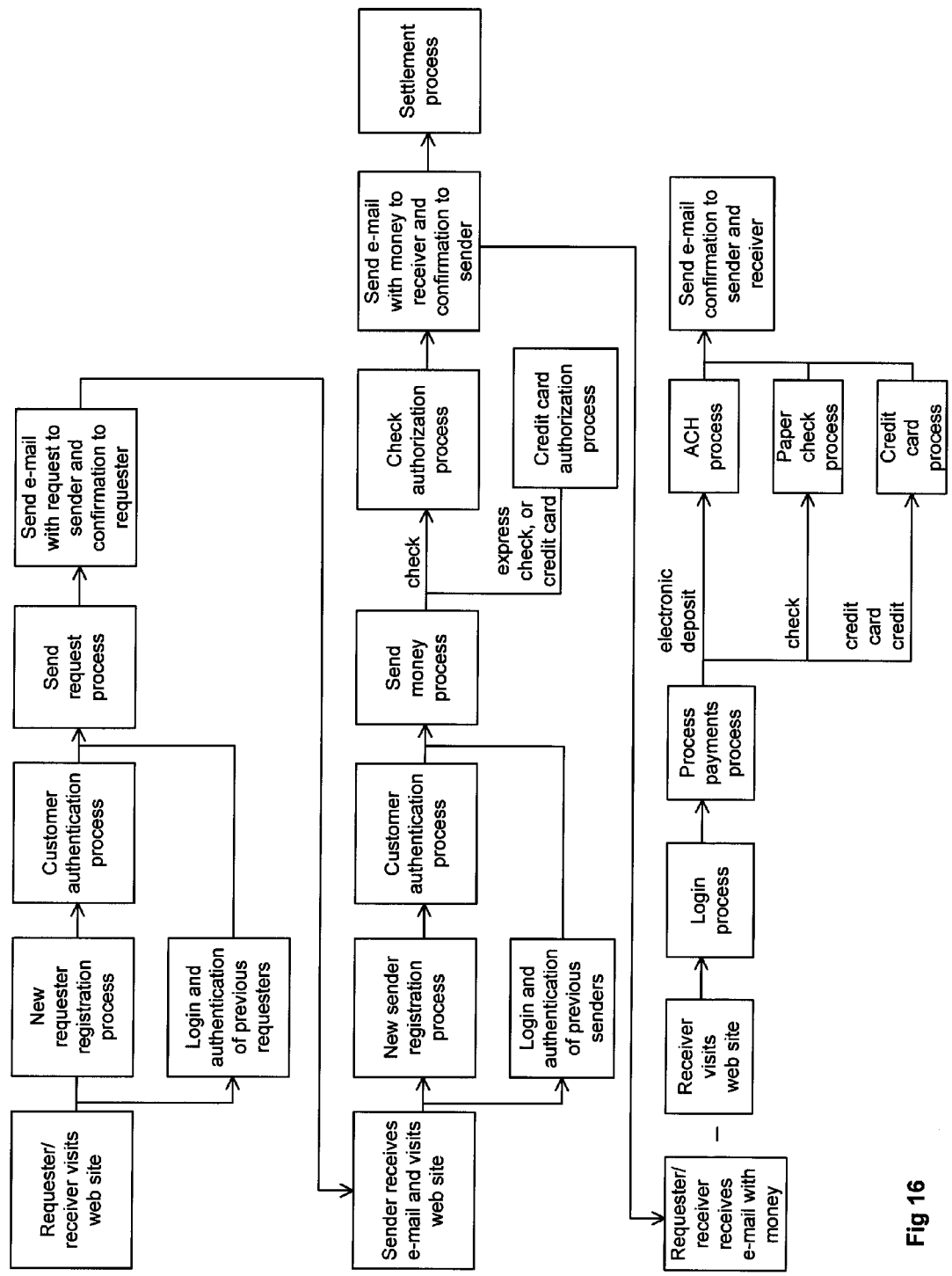

SYSTEM AND METHOD FOR SENDING MONEY VIA E-MAIL OVER THE INTERNET

BACKGROUND OF THE INVENTION

The present invention generally relates to a system and method for sending money via electronic mail and, more particularly, to a system and method for sending money via electronic mail over a computer network wherein a sender identifies a withdraw account such as a checking account and/or a credit card account and a receiver identifies a deposit account such as a checking account or credit card account.

The Internet is a public network of computers which is, in simplified fashion, a web of autonomous computers and computer servers ("ACCS") linked to data switches or routers and connected together. The ACCS are typically owned and operated by Internet Service Providers ("ISP") such as PSI, UUNET, MCI, SPRINT, etc. The ACCS are link by telecommunication lines to form the Internet. Large data sources such as universities, governments, and corporations, collect and market information through their own Internet servers connected to the Internet. Users typically access the Internet using an Internet access device such as a personal computer or WEB TV which are connected to an ISP via a telecommunications line. The ISP typically provides numerous services for its users such as, for example, electronic messaging or mail ("e-mail") and access to the World Wide Web ("WWW").

Each resource (e.g., computer or computer server) is identified by a unique Uniform Resource Locator ("URL"). Computer servers (typically called "Web servers" or "Web sites"), store information on graphical pages called Web pages. To view specific information, a user specifies the URL for the Web page in a request (e.g., a HyperText Transfer Protocol ("HTTP") request). The request is forwarded to the Web server that supports the Web page and the Web server sends the Web page of information to the user's computer. The user's computer displays the Web page, typically using a browser which is a special-purpose application program which requests and displays Web pages.

Web pages are typically defined using HyperText Markup Language ("HTML"). HTML provides a standard set of tags that define how a Web page displays various text, graphics, controls, and other features. When the user requests the browser to display a Web page, the browser sends a request to the Web server to transfer to the user's computer an HTML document that defines the Web page. When the requested HTML document is received, by the user's computer, the browser displays the Web page as defined by the HTML document. The HTML document may contain URL's of other Web pages available on that Web server or other Web servers.

The Internet is considered to have enormous potential as means of communication, source of information, and marketplace for products. It is now possible to communicate with virtually everyone with a computer, to obtain information about virtually everything, and to purchase virtually anything via the Internet. Although the Internet has enormous potential, use of the Internet may not be developing at a rate it can and should develop. One reason for this depressed development is the difficulty to send money over the Internet. A user cannot send cash or a check over the Internet and sending a credit card number via the Internet is only an option if the sender has a credit card and the recipient has a credit card merchant account as required by credit card companies. Additionally, the alternative of sending cash or a check via a physical delivery service is slow and burdensome and is relatively expensive to obtain a shorter delivery time. Accordingly, there is a need for an improved system and method of sending money via the Internet.

SUMMARY OF THE INVENTION

The present invention provides a system and method of sending money via electronic message or mail over a computer network which overcomes at least some of the above-identified problems of the prior art. According to the present invention, a money-mailing method includes the step of a sender identifying, to a server over the network, an amount of money to be transferred to a receiver and a withdraw account from which the amount of money is to be transferred. The server sends an electronic message to the receiver over the network to inform the receiver that the sender is transferring money to the receiver and to request the receiver to contact the server to receive the money. The receiver contacts the server in response to the electronic message and identifies a deposit account to which money is to be transferred. Money is transferred from the withdraw account and money is transferred to the deposit account.

According to another aspect of the present invention, the money-mailing method includes a receiver identifying, to a server over a network, a sender from whom money is to be transferred to the receiver, and a deposit account to which money is to be transferred. The server sends an electronic message to the sender over the network to inform the sender that the sender should transfer money to the receiver and to request the sender to contact the server to transfer money. The sender contacts the server in response to the electronic message and identifies a withdraw account from which money is to be transferred. Money is transferred from the withdraw account and money is transferred to the deposit account.

According to yet another aspect of the present invention, a money-mailing system includes a server and programming code on the server. The programming code is adapted for receiving a request from a sender over the network to transfer money to a receiver and for receiving identification from the sender over the network of a withdraw account from which money is to be transferred. The programming code is further adapted for sending, in response to the request, an electronic message to the receiver over the network to inform the receiver that the sender is transferring money and to request the receiver to contact the server to receive the money. The programming code is even further adapted for receiving, in response to the electronic message, identification from the receiver over the network of a deposit account to which money is to be transferred.

According to even yet another aspect of the present invention, a money-mailing system includes a server and programming code on the server. The programming code is adapted for receiving a request from a receiver over the network to receive money from a sender and for receiving identification from the receiver over the network of a withdraw account to which money is to be transferred. The programming code is further adapted for sending, in response to the request, an electronic message to the sender over the network to inform the sender that the sender should transfer money to the receiver and to request the sender to contact the server to transfer money. The programming code is even further adapted for receiving, in response to the electronic message, identification from the sender over the network of a deposit account from which money is to be transferred.

BRIEF DESCRIPTION OF THE SEVERAL VIEWS OF THE DRAWING

These and further features of the present invention will be apparent with reference to the following description and drawing, wherein:

FIG. 11 is a block diagram showing typical sender-identification information used with the money-mailing system and method of FIGS. 1 and 2;

FIG. 12 is a block diagram showing typical bank-customer information used with the money-mailing system and method of FIGS. 1 and 2;

FIG. 13 is a block diagram showing typical bank-noncustomer information used with the money-mailing system and method of FIGS. 1 and 2;

FIG. 14 is a block diagram showing typical send-transaction information used with the money-mailing system and method of FIGS. 1 and 2;

FIG. 15 is a block diagram showing typical credit-card information used with the money-mailing system and method of FIGS. 1 and 2; and FIG. 16 is a flow chart diagrammatically illustrating a second embodiment of the money-mailing method of FIG. 2.

DETAILED DESCRIPTION OF PREFERRED EMBODIMENTS

Figure 1:
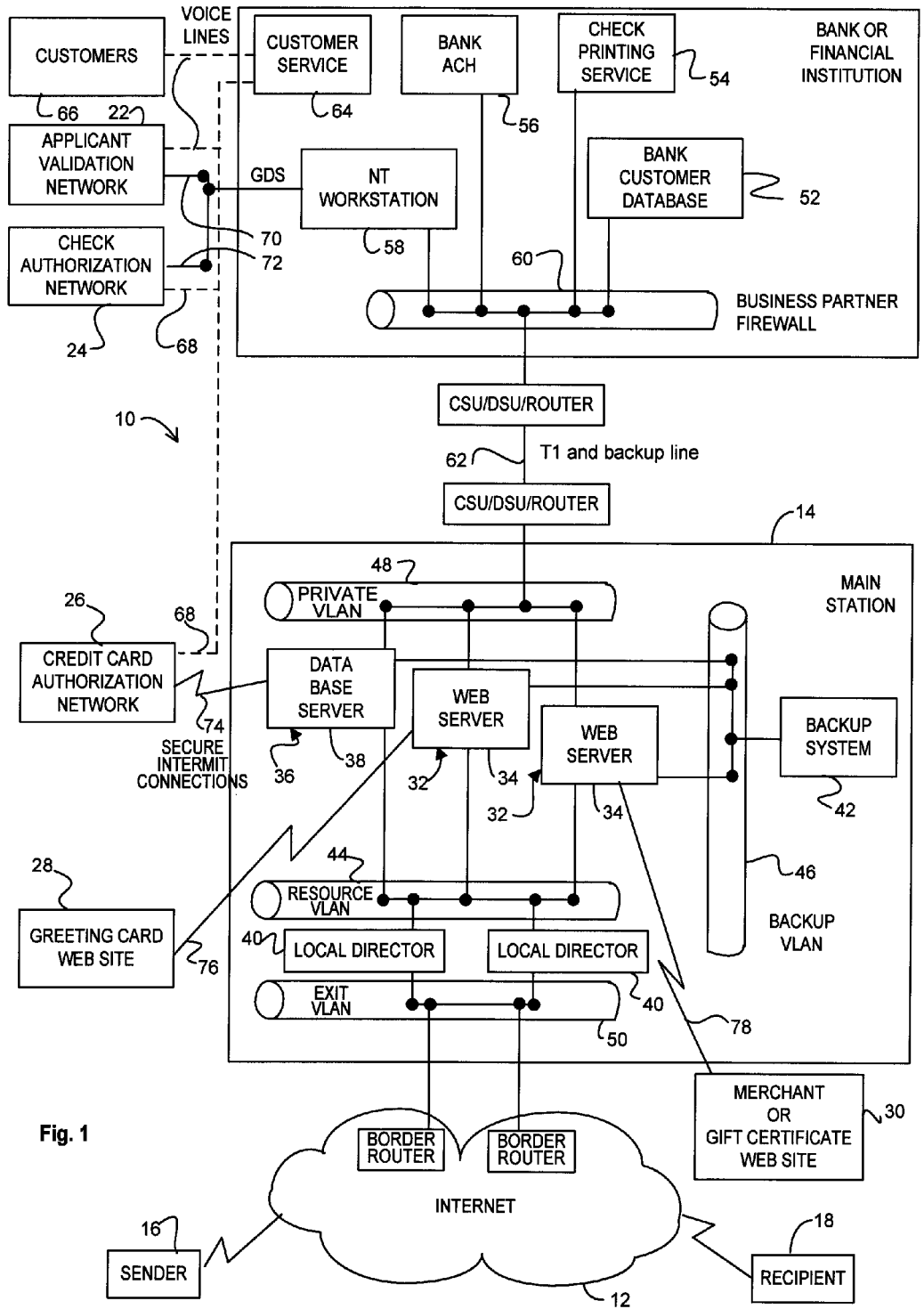
FIG. 1 is a diagrammatic view of a system for sending money via electronic mail over a computer network according to the present invention.
Figure 2:
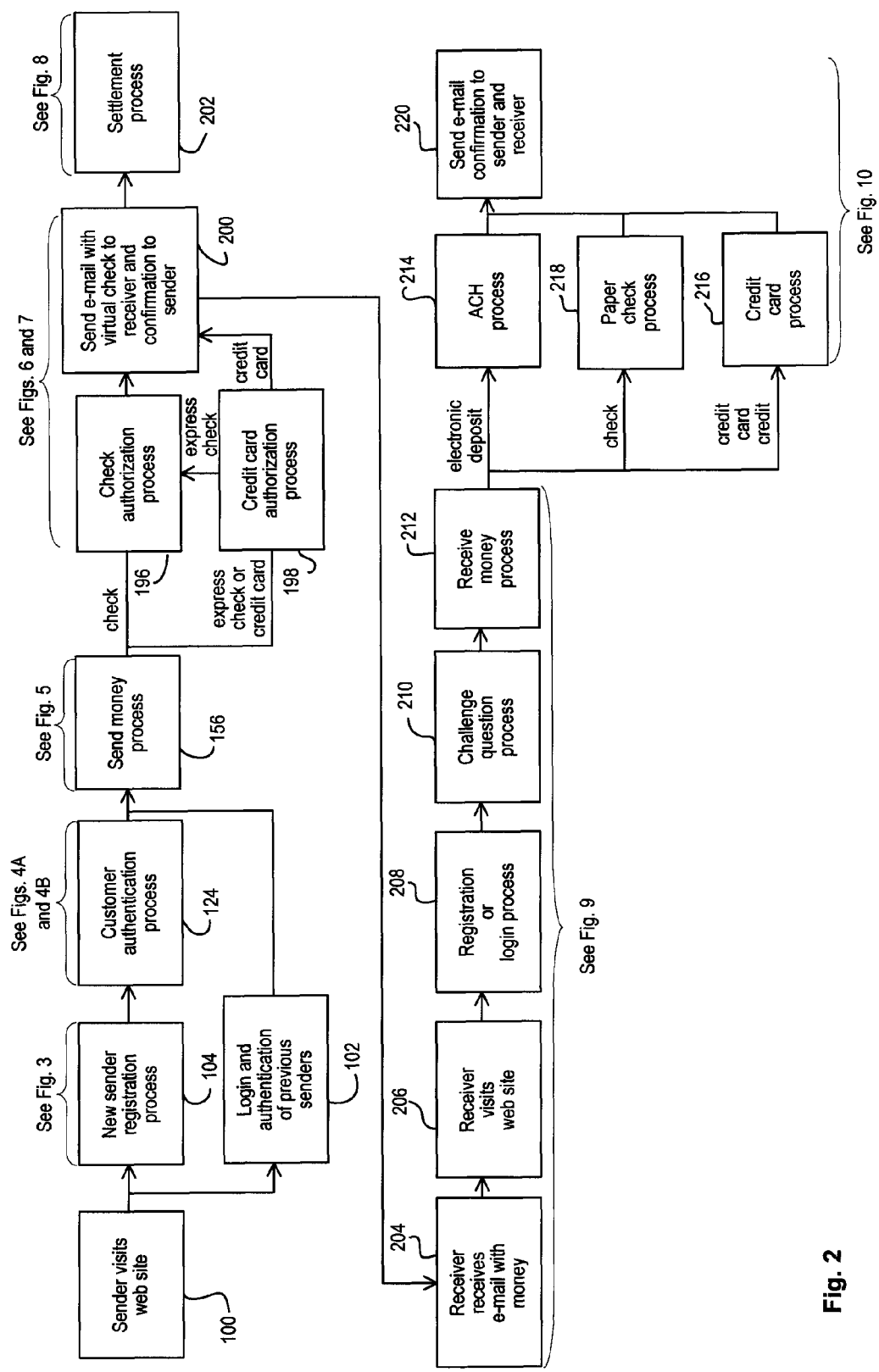
FIG. 2 is a flow chart diagrammatically illustrating a method for sending money via electronic mail over a computer network using the money-mailing system of FIG. 1.

FIG. 1 illustrates a block diagram of a system 10 for sending money via electronic messaging or mail ("e-mail") over a computer network such as the Internet 12 according to a preferred embodiment of the present invention. It is noted that while the money-mailing system 10 of the present invention is particularly useful with the Internet 12 and is shown and described using the Internet 12, the money-mailing system 10 can be used in conjunction with other communications systems or networks, with or without a central management system, within the scope of the present invention such as, for example, centrally managed networks (e.g., America Online, Prodigy, etc.) local Area networks, wide area networks, point-to-point dial-up connections, and the like.

The illustrated money-mailing system 10 includes a main station 14 which is accessed by senders and receivers 16, 18 via the Internet 12 to send money e-mail, a bank 20 for performing financial transactions of the money mailing system 10, an applicant validation network 22 for authenticating new customers, a check authorization network 24 for authorizing ACH transactions, a credit card authorization network 26 for authorizing credit card transactions, a greeting card web site 28 for including an electronic greeting card with e-mail when desired by the customer, and a merchant or gift certificate web site 30 for providing electronic gift certificates and/or goods for electronic gift certificates.

The main station 14 of the money-mailing system 10 preferably has at least one web server 32 for providing a web site 34, at least one database server 36 for providing a database 38 to process and store information, at least one local director 40 for connecting separate VLANs, and a backup system 42 for providing backup storage of data. The illustrated main station 14 includes two web servers 32 but any number of web servers 32 can be utilized to meet the required simultaneous use of the money-mailing system 10. Suitable web servers 32 are believed to be available from the Compaq Computer Company of Houston, Tex. The illustrated main station 14 includes one database server 36 but any number of database servers 36 can be utilized to meet the required simultaneous use of the money-mailing system 10. Suitable database servers 36 are believed to be available from Sun Microsystems, Inc. of Palo Alto, Calif. It is noted that the database server 36 is preferably separate from the web servers 32 for added security but all of the servers 32, 36 can be combined if desired. The illustrated servers 32, 36 are connected via a resource VLAN 44, a backup VLAN 46, and a private VLAN 48. The resource VLAN 44 is connected to an exit VLAN 50 through at least one local director 40. The illustrated main station 14 includes two local directors 40 but any number of local directors 40 can be utilized to meet the simultaneous use demands of the money-mailing system 10. Suitable local directors are available from Cisco Systems, Inc. of San Jose, Calif. Customers, such as the illustrated sender and receiver 16, 18, access the exit VLAN 50 via the Internet 12 in a conventional manner. Suitable firewalls are created and maintained by a suitable provider such as, for example, GTE Internetworking between the customers 16, 18 and the components of the main station 14. While a single sender 16 and a single receiver 18 are shown in FIG. 1, it is understood that many senders and receivers 16, 18 can access the money-mailing system 10 via the Internet 12 at the same time. The backup system 42 is in communication with the servers 32, 36 via the backup VLAN 46. A suitable backup system 42 is available from Legato Systems, Inc. of Palo Alto, Calif. The servers 32, 36 are in communication with the bank 20 through the private VLAN 48 as described in more detail hereinbelow.

The bank 20 includes a customer database 52 for storing data regarding customer accounts, a check printing service 54, such as what can be provided by the EDS Corporation, for processing and mailing paper checks, an ACH group 56 for processing ACH transactions, and a computer workstation 58 for communicating with various business partners. The bank components 52, 54, 56, 58 are in communication via a VLAN 60 and separated by a firewall created and maintained by a suitable provider such as, for example, GTE Internetworking. The bank VLAN 60 is in communication with the private VLAN 48 of the main station 14 via a primary telecommunications line 62 and preferably at least one backup telecommunications line. The primary telecommunications line 62 is preferably a "wide band" line such as a T1 line or the like. The illustrated bank 20 also includes a customer service department 64 which is in communication with customers 66 and business partners 22, 24, 26 via voice telecommunications lines 68. The customer service department can alternatively be an external provider which can be in communications with customers and business partners via voice and data telecommunications lines and/or the Internet. It is noted that the term bank 20 as used in this specification and claims includes traditional banks as well as savings and loans, credit unions, and other such financial institutions which provide necessary banking functions such as ACH transactions.

The illustrated applicant validation network 22 is a business partner providing the service of authenticating new customers by providing fraud checks as known in the industry. The applicant validation network 22 is preferably a debit scoring system such as ChexSystems of the Deluxe Corporation of Shoreview, Minn. The illustrated applicant verification network 22 is in direct communication with the bank workstation 58 via a telecommunications line 70 but alternatively can be in direct communication with the servers 32, 36 via a secure Internet connection.

The illustrated check authorization network 24 is a business partner providing the service of authorizing ACH transactions. The check authentication network 24 is preferably a clearinghouse for ACH transactions such as eFunds of the Deluxe Corporation of Shoreview, Minn. The illustrated check authorization network 24 is in direct communication with the bank workstation 58 via a telecommunications line 72 but alternatively can be in direct communication with the servers 32, 36 via a secure Internet connection.

The illustrated credit card authorization network 26 is a business partner providing the service of authorizing credit card transactions. The credit card authorization network 26 is preferably an Internet based clearing house for credit card authorization such as CyberSource Corporation of San Jose, Calif., but can alternatively can be the credit card companies such as, for example, VISA and MASTERCARD. The illustrated credit card authorization network 26 is in direct communication with the database server 36 via a secure Internet connection.

The greeting card web site 28 is a business partner providing the service of including an electronic greeting card with e-mail when desired by the customer. The illustrated greeting card web site 28 is in direct communication with the web server 32 via a secure internet connection 76 but alternatively can be in direct communication with the web database 36.

The merchant or gift certificate web site 30 is a business partner providing a service such as providing goods or services to be purchased with the money or providing electronic gift certificates with the money for later purchase of goods or services. The illustrated merchant or gift certificate web site 30 is in direct communication with the web server 32 via a secure internet connection 78 but alternatively can be in direct communication with the web database 36.

FIGS. 2-10 illustrate a preferred method according to the present invention for sending money via e-mail over a computer network such as the Internet 12 using the money-mailing system 10 of FIG. 1. It is noted that while the servers 32, 36 and any other processors of the money-mailing system 10 are preferably provided with programming code adapted to perform the method described hereinbelow, there are many variations of the money-mailing method within the scope of the present invention. A first stage 100 of the money-mailing method is a web-site visiting process. The sender 16 visits the web site 34 of the money-mailing system 10 via the Internet 12. The web server 32 displays a web site or home page which provides information about the money-mailing system 10. When the sender 16 clicks on a "send money" button via a mouse, the sender 16 is requested to identify whether they are a first time sender using the money-mailing system 10. For first time senders, the money-mailing system 10 proceeds to a third stage 104 as described in detail hereinbelow. For previous senders, the money-mailing system 10 proceeds to a second stage 102.

Figure 3:
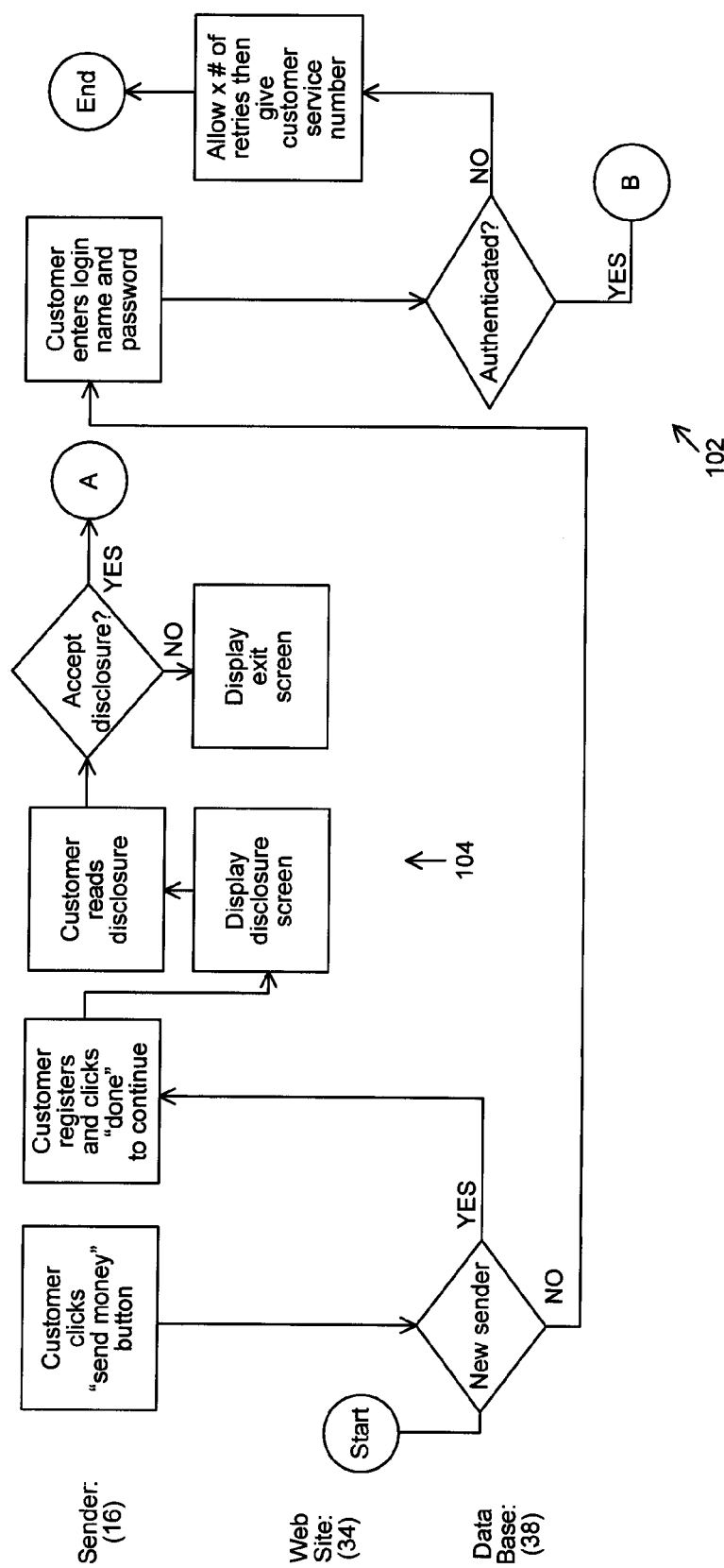
FIG. 3 is a flow chart diagrammatically illustrating a registration process for new senders and logging-in and authenticating process for previous senders of the money-mailing method of FIG. 2.

The second stage 102 of the money-mailing system 10 is a logging-in and authenticating process for senders 16 who have previously sent money using the money-mailing system 10. As best shown in FIG. 3, if the sender 16 is not a first time sender, they are asked to enter their login name and their password which they previously provided as described in detail hereinbelow. The money-mailing system 10 authenticates the login name and the password input by the sender 16 to verify that the sender 16 is a customer in "good standing". If the login name and password cannot be authenticated, the sender 16 is preferably given at least one additional try to input the information. If the login name and password are not authenticated within a predetermined number of retries, the web site 34 displays an "exit page" which preferably provides a phone number for the customer service department 64. If the sender 16 is authenticated to be a customer "not in good standing", the web site 34 displays an "exit page" which preferably provides a phone number of the customer service department 64. If the sender 16 is authenticated to be a customer in "good standing", the sender 16 is given the option of viewing a list of previous transactions they made through the money-mailing system 10, canceling a previous transaction if not beyond a predetermined point, or beginning a new transaction. The list of previous transactions preferably includes the status of each transaction, who the e-mail was sent to, how much money was sent, when a check was posted, when a check was cashed etc. The money-mailing system 10 then proceeds to a fifth stage 156 as described in detail hereinafter.

The third stage 104 of the money-mailing system 10 is a registration process for senders 16 who have not previously sent money using the money-mailing system 10. When the sender 16 is a first time sender, the web site 34 displays a "new sender page" and requests the sender 16 to register as a sender 16 by providing sender-identification information 106. FIG. 11 illustrates typical sender-identification information 106 such as, for example, first name 108, middle name 110, last name 112, suffix 114, network or e-mail address 116, login name 118, password 120, and password hint 122. Once the requested sender-identification information 106 is input, the sender clicks on a "done" button via a mouse to continue. The web site 34 displays a "disclosure page" showing a disclosure regarding the money-mailing system 10 and requests the sender 16 to read the disclosure and indicate whether they accept the terms of the disclosure. If the sender 16 does not accept the terms of the disclosure, the web site 34 displays the "exit page". If the sender 16 accepts the terms of the disclosure, the money-mailing system 10 proceeds to a fourth stage 124.

The fourth stage 124 of the money-mailing system 10 is a customer authentication process. Customer authentication is performed to identify customers which will most likely have check or credit card transactions denied prior to requesting a check or credit card authorization. The sender-identification information 106 which was provided by the sender 16 is authenticated to approve or deny the sender 16 as a customer in "good standing". Preferably the sender's e-mail address 116 is validated prior to beginning the customer authentication process 124. The e-mail address 116 can be validated by simply sending an e-mail to the address, without making the sender 16 leave the web site 34, while the customer authentication process 124 proceeds in parallel. If the e-mail "bounces", i.e. a message is returned that the address cannot be located, the sender 16 is still at the web site 3 to enable corrective action.

Figure 4A:
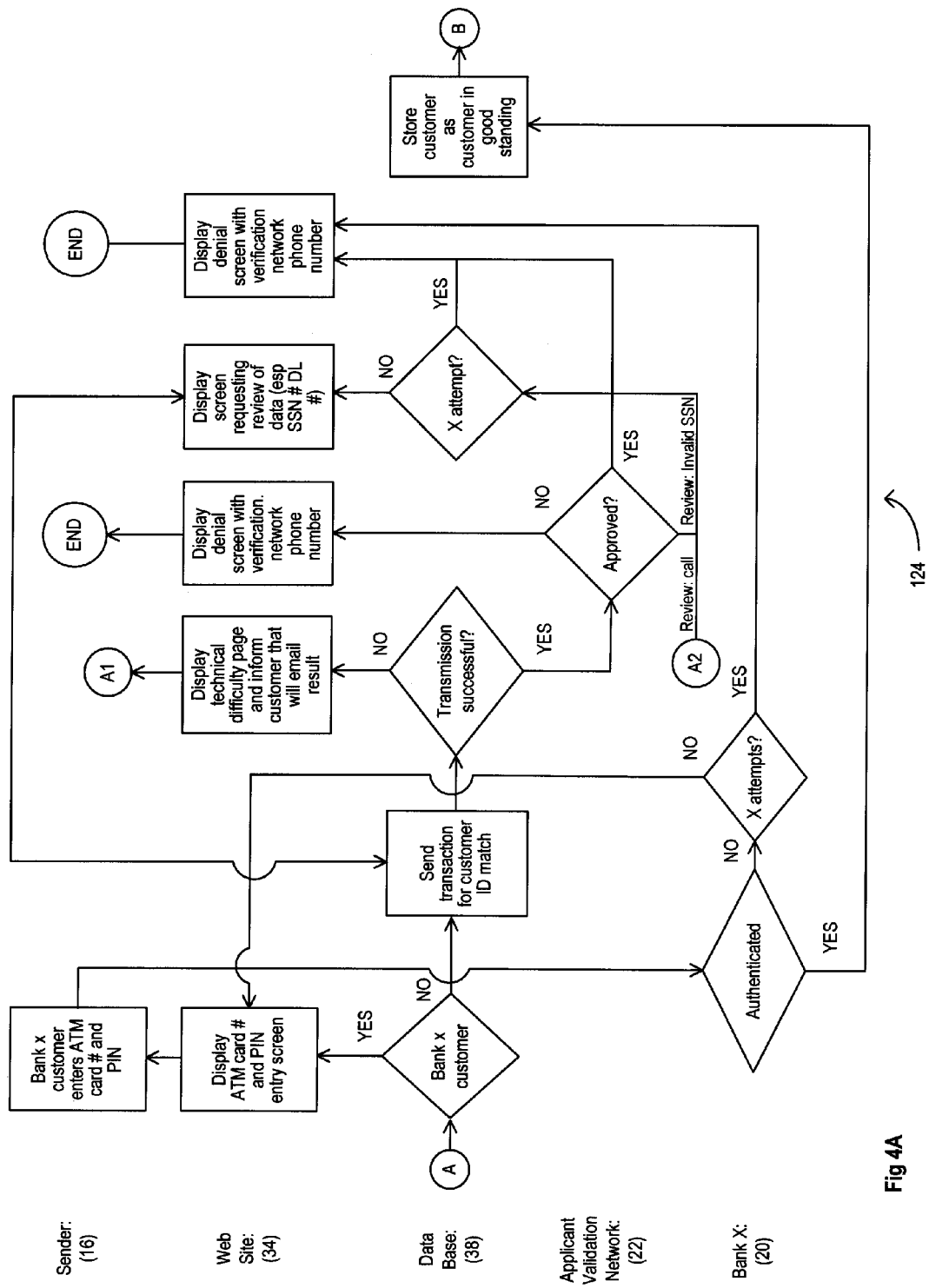
FIGS. 4A and 4B are flow charts diagrammatically illustrating a new customer authentication process of the money-mailing method of FIG. 2.
Figure 4B:
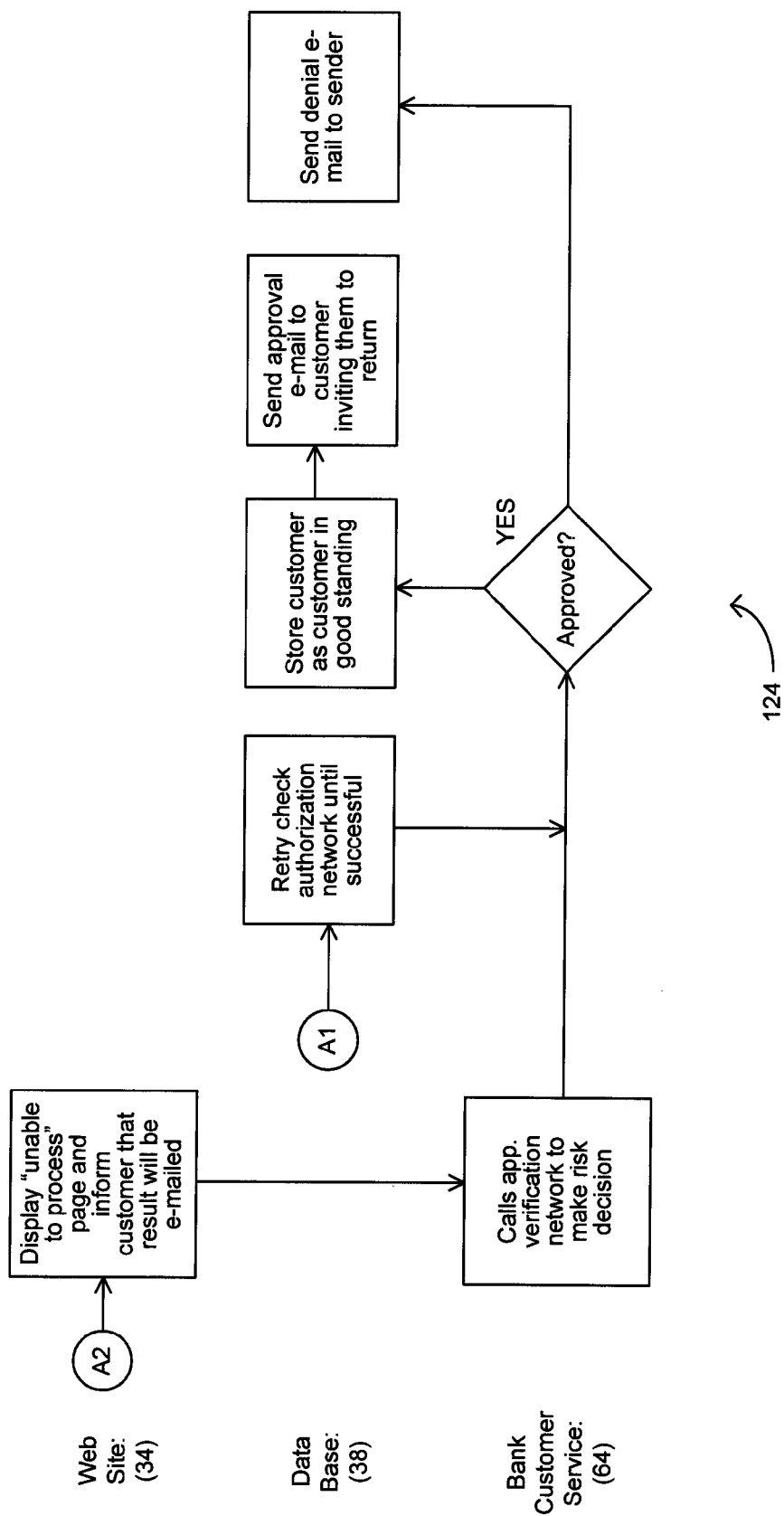

As best shown in FIGS. 4A and 4B, the customer authentication process 124 preferably begins by inquiring whether the sender 16 is a current customer of the money-mailing-system bank 20. If the sender 16 is a customer of the money-mailing-system bank 20, the web site 34 displays a "bank-customer information page" and requests the sender 16 to input bank-customer information 126. FIG. 12 illustrates bank-customer information 126 such as, for example, an ATM card number 128, PIN 130, and social security number 132. Once the bank-customer information 126 is input, the sender 16 clicks a "done" button via a mouse to continue and the money-mailing system 10 begins to authenticate the bank-customer information 126 provided by the sender 16. If the bank-customer information 126 cannot be authenticated, the sender 16 is preferably given at least one additional try to input the bank-customer information 126. If the bank-customer information 126 fails to be authenticated in a predetermined number of retries, the web site 34 displays the "exit page" which preferably provides a phone number for the customer service department 64. If the bank-customer information 126 is authenticated, the sender 16 is stored in the data base 38 as a customer in "good standing".

If the sender 16 is not a current customer of the money-mailing-system bank 20, the web site displays a "bank-noncustomer information page" and requests the sender to input bank-noncustomer information 134. FIG. 13 illustrates typical bank-noncustomer information 134 such as, for example, social security number 142, city 144, state 146, zip code 148, driver's license/state I.D. number 150, issuing state 152, and date of birth 154. The money-mailing system 10 sends at least some of the bank-non-customer information 134 to the applicant validation network 22 for approval of the sender 16 as a customer. If transmission of the bank-noncustomer information 134 is not successful, the web site 34 preferably displays a "technical difficulties page" and informs the sender 16 that the money-mailing 10 will e-mail the result of the customer approval inquiry when available. If the applicant validation network 22 denies the sender, the web site 34 displays a "denial page" which preferably provides a phone number for the application validation network 22. If the application validation network 22 requires review and a risk decision, the web site 34 displays an "unable to process page" which informs the sender 16 that that the money-mailing system 10 will e-mail the result of the customer approval inquiry when available. Off line, the customer service department 64 of the bank 20 contacts the applicant validation network 22 to make a risk decision regarding the sender 16. If the sender 16 is subsequently denied, an e-mail is sent to the sender 16 informing them of the denial. If the sender 16 is subsequently approved, an e-mail is sent to the sender 16 informing them of the approval and inviting them to return to the money-mailing-system web site 34 to complete the transaction. The sender 16 is also stored in the database 38 as a customer in "good standing". If the applicant validation network 22 requires review because of invalid information 134 such as, for example, an invalid social security number 142 or an invalid driver's license number 150, the web site 34 displays a "review data screen" which displays the bank-noncustomer information 134 and requests the sender 16 to check the bank-noncustomer information 134. The sender 16 is preferably given at least one additional try to input the information 134. If the sender 16 is not approved after a predetermined number of retries, the web site 34 displays the "exit page" which preferably provides a phone number for applicant validation network 22. If the sender 16 is approved, the sender 16 is stored in the database as a customer in "good standing" and the money-mailing system 10 proceeds to the fifth stage 156.

Figure 5:
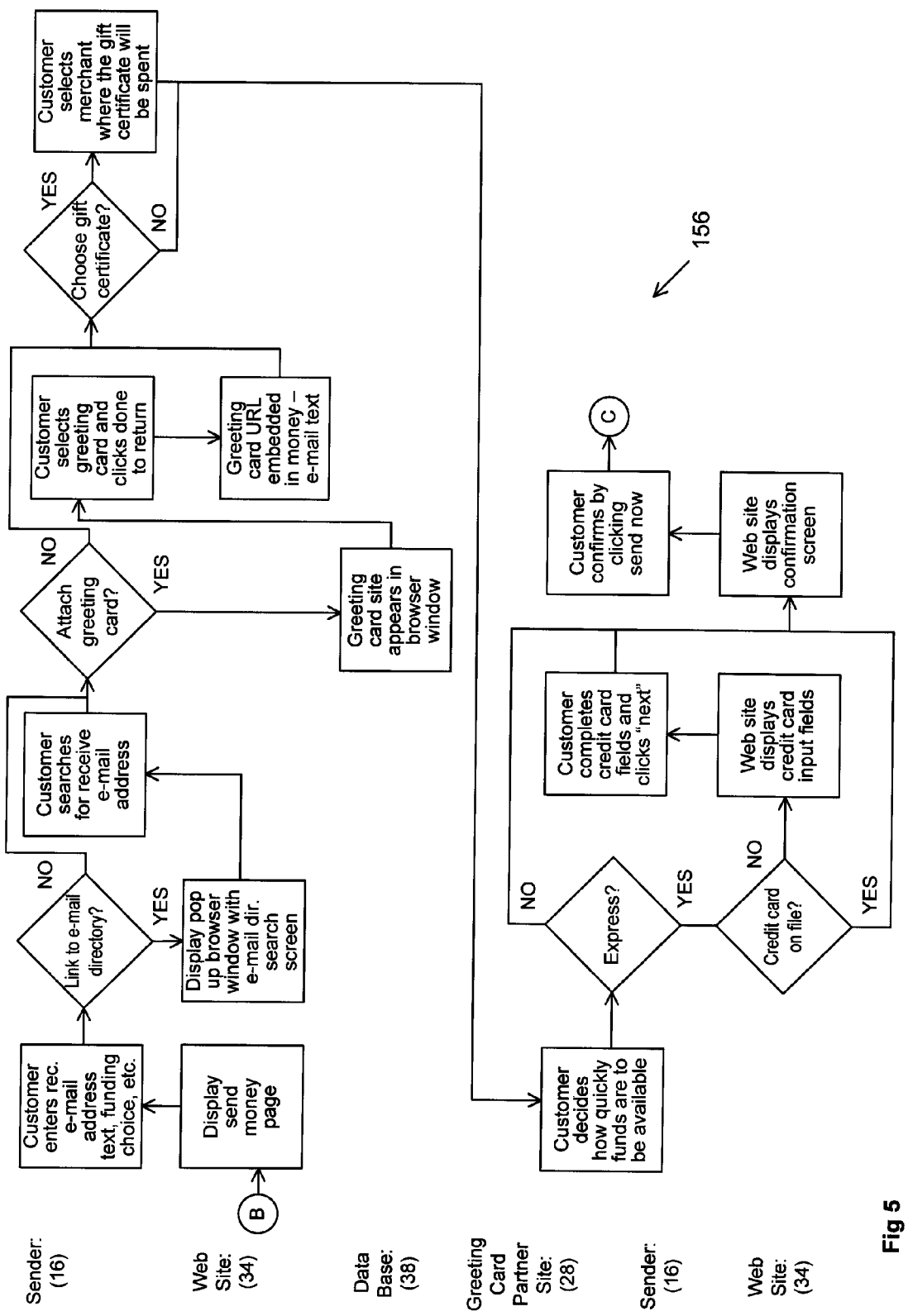
FIG. 5 is a flow chart diagrammatically illustrating a send money process of the money-mailing method of FIG. 2.

The fifth stage 156 of the money-mailing system 10 is a send money process, that is, a process of obtaining information about the desired transaction. As best shown in FIG. 5, the web site 34 displays a "send money page" once the sender 16 is authenticated as a customer in "good standing". The "send money page" requests the sender 16 to provide send-transaction information 158. FIG. 14 illustrates typical send-transaction information 158 such as, for example, the receiver's name 160, the receiver's network or e-mail address 162, a challenge question 164, an expected response 166 to the challenge question 164, the amount of money 170 to be sent to the receiver 18, a subject or title 172 for the e-mail, and a message 174 to be included in the e-mail. The sender 16 is preferably given the opportunity to be linked to an network or e-mail directory to locate the receiver's e-mail address 162 if necessary. The receiver's e-mail address 162 is preferably stored in an address book for the sender's future reference. Preferably, the sender 16 provides the challenge question 164 for the receiver 18 and at least one expected response 166 by the receiver 18. The challenge question 164 should be crafted such that only the sender 16 and the receiver 18 know the answer. Examples of suitable challenge questions 164 (such as, for example, where did we go to eat last Friday? or How much money did I e-mail to you last week?) should be displayed to the sender 16. The challenge question 164 provides an added level of security to ensure that the responding individual is the intended receiver 18 and not someone else who has access to the receiver's e-mail address 162. The sender 16 is also preferably given the opportunity to provide a message 174 to be included in the e-mail.

In the illustrated embodiment, the sender 16 is given the opportunity to attach an electronic greeting card to the e-mail. If the sender 16 chooses to attach an electronic greeting card, the greeting card web site 28 appears in the window and the sender 16 selects a desired greeting card. The sender 16 then clicks on a "done" button to return to the web page of the web site 34. The money-mailing system 10 preferably embeds a URL of the greeting card web site 28 in the text of the e-mail. It is noted that web sites of greeting card providers can also provide links to the money-mailing system 10 so that customers of the greeting card providers have an opportunity to send money with an electronic greeting card.

It is noted that the money-mailing method can alternatively be initiated from the greeting card site 28. While at the greeting card site 28, the customer is asked if they would like to send money with an electronic greeting card. If the customer chooses to send money, the money-mailing process is initiated. The customer can be visually or transparently transferred to the money-mailing web site 34.

In the illustrated embodiment, the sender 16 is also given the opportunity to send an electronic gift certificate to the receiver 18. If the sender chooses to send an electronic gift certificate, they can select a merchant or merchants where the electronic gift certificate can be used to purchase goods or services. Links can be provided to the merchant site 30 or a clearinghouse site 30 for gift certificates It is noted that web sites 30 of merchants can provide links to the money-mailing system 10 to provide customers of the merchants an opportunity to send gift certificates to others.

It is noted that the money-mailing method can alternatively be initiated from the merchant or gift certificate web site 30. While at the merchant or gift certificate site 28, the customer is asked if they would like to send a gift certificate to a receiver 18. If the customer chooses to send a gift certificate, the money-mailing process is initiated. The customer can be visually or transparently transferred to the money-mailing web site 34.

As part of the fifth stage 156, the sender 16 is asked to identify what type of account the money is to be withdrawn from, that is to identify a withdraw account. The sender is preferably given the option of identifying a checking account or a credit card account as the withdraw account. When the sender 16 chooses to send money from a checking account, i.e. send a "virtual check", the sender 16 is preferably given a choice of when the funds will be available to the receiver 18 such as, for example, by an "ordinary" check (available in about four days business days) or by an "express" check which is secured by a credit card account (available within about 24 hours.

If the sender 16 chooses an ordinary check, the web site 34 preferably displays an image of a check with fields for required information at typical locations. Once the withdraw account information has been provided such as, for example, bank number, account number, and check number, the web site 34 displays a "confirmation page" which shows information about the transaction including the amount of money to be withdrawn from the checking account. The amount of money to be withdrawn from the checking account is preferably the amount of money requested to be sent to the receiver 18 plus a transaction fee. Once the sender 16 confirms the information, the sender 16 clicks on a "send now" button via a mouse and the money-mailing system proceeds to a sixth stage 196.

Figure 6:
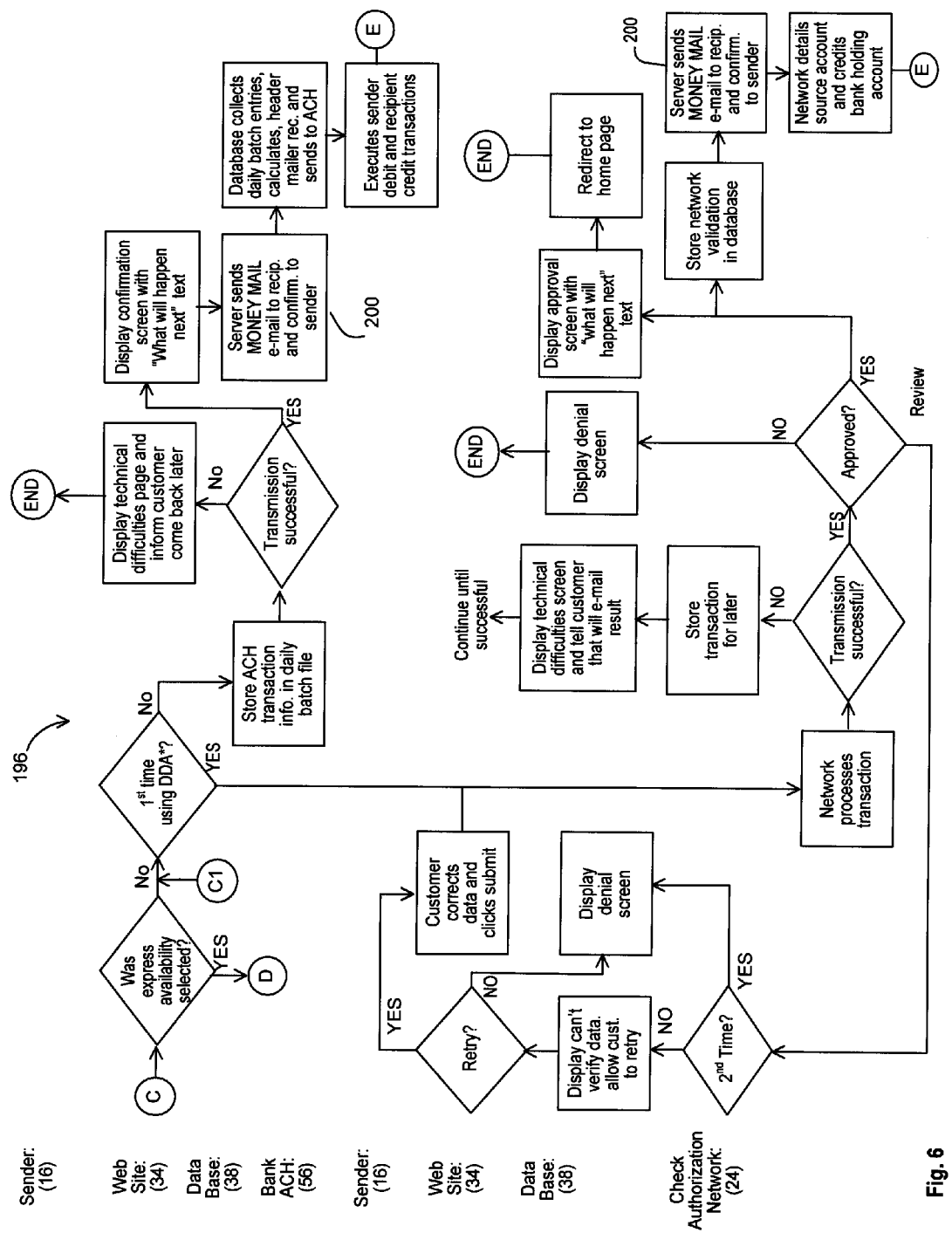
FIG. 6 is a flow chart diagrammatically illustrating a check authorization process of the money-mailing method of FIG. 2.

The sixth stage 196 of the money-mailing system 10 is a check authorization 19 process. As best shown in FIG. 6, if an ordinary check is being sent and it is not the first time the bank account number is being used by the money-mailing system 10, the data base 38 stores the ACH transaction in a daily batch file. If storage of the ACH transaction is not successful, the web site 34 displays a "technical difficulties page" and informs the sender 16 to come back to the web site 34 at a later time to complete the transaction. If storage of the ACH transaction is successful, the web site 34 displays a "confirmation page" which provides a transaction number and information of what will happen next and informs the sender 16 that they can exit the web site 34 or begin another transaction. The money-mailing system 10 proceeds to the eighth stage as described in detail hereinbelow. The database 38 collects the daily batch entries and sends them to the bank ACH 56 which executes a debit to the sender's account and a credit to a bank holding or settlement account.

If an ordinary check is being sent and it is the first time the bank account number 128, 138 has been used by the money-mailing system 10, the check transaction is sent to the check authorization network 24 for approval. If transmission of the check transaction is not successful, the web site 34 preferably displays a "technical difficulties page" and informs the sender 16 that the money-mailing system 10 will e-mail the result of the check approval inquiry when available. If the transmission is successful and the check authorization network 24 denies the transaction, the web site 34 displays a "denial page" which preferably provides a phone number for the check authorization network 24. If the transmission is successful and the check authorization network 24 requires review and discussion, the web site 34 displays an "unable to process page" which informs the sender 16 that that the money-mailing system 10 will e-mail the result of the check approval inquiry when available. Off line, the customer service department 64 of the bank 20 contacts the check authorization network 24 to make a risk decision regarding the check transaction. If it is subsequently decided to deny the check transaction, an e-mail is sent to the sender 16 informing them of the denial. If it is subsequently decided to approve the check transaction, an e-mail is sent to the sender 16 informing them of the approval and confirming completion of the transaction. If the transmission is successful and the check authorization network 24 requires review because of invalid information such as, for example, an invalid routing number, the web site 34 displays a "review data screen" which displays the information and requests the sender to verify the information. The sender 16 is preferably given at least one additional try to input the information. If the check transaction is not approved after a predetermined number of retries, the web site 34 displays a "denial page" which preferably provides a phone number for the check authorization network 24. If the check transaction is approved, the money-mailing system 10 stores the check authorization network validation and the web site 34 displays a "confirmation screen" which provides a transaction number and information of what will happen next and informs the sender 16 that they can now exit the web site 34 or begin another transaction. The money-mailing system 10 proceeds to the eighth stage 200 as described in detail hereinbelow. The check authorization network 24 debits the sender's account and credits a bank holding or settlement account.

If the sender 16 chooses an express check and they have credit-card-information 176 on file, the web site 34 preferably displays an image of a check with fields for required information at typical locations. Once the withdraw account information has been provided such as, for example, bank number, account number, and check number, the web site 34 displays a "confirmation page" which shows information about the transaction including the amount of money to be withdrawn from the checking account. The amount of money to be withdrawn from the checking account is preferably the amount of money requested to be sent to the receiver 18 plus a transaction fee. Once the sender 16 confirms the information, the sender 16 clicks on a "send now" button via a mouse and the money-mailing system 10 proceeds to a seventh stage 198 as described in detail hereinbelow.

If the sender 16 chooses an express check and they do not have credit-card information 176 on file, preferably displays an image of a check and a credit card with fields for required information at typical locations. Once the checking and credit card account information has been provided such as, for example, bank number, checking account number, check number, credit card number, and credit card expiration date, the web site 34 displays a "confirmation page" which shows information about the transaction including the amount of money to be withdrawn from the checking account or debited to the credit card account. The amount of money to be withdrawn from the checking account or debited to the credit card account is preferably the amount of money requested to be sent to the receiver 18 plus a transaction fee. Once the sender 16 confirms the information, the sender 16 clicks on a "send now" button via a mouse and the money-mailing system 10 proceeds to the seventh stage.

If the sender 16 chooses a credit card account and they have credit-card-information 176 for that account on file, the web site 34 displays a "confirmation page" which shows information about the transaction including the amount of money to be debited from the credit card account. The amount of money to be debited from the credit card account is preferably the amount of money requested to be sent to the receiver 18 plus a transaction fee. Once the sender 16 confirms the information, the sender 16 clicks on a "send now" button via a mouse and the money-mailing system 10 proceeds to a seventh stage 198 as described in detail hereinbelow.

If the sender 16 chooses a credit card and they do not have credit-card information 176 on file, the web site 34 displays a "credit-card information page" which requests the sender to input the credit-card information 176. FIG. 15 illustrates suitable credit-card information 176 such as, for example, credit card account number 178. expiration date 180, card verification value (CVV) 182, first and last names 184, 186 (as appearing on the card), street address 188, city 190, state 192, and zip code 194. Preferably, the web site 34 displays an image of a credit card with fields for the required information at typical locations. Once all of the fields are completed, the sender 16 clicks on a "next" button via a mouse and the web site 34 displays a "confirmation page" which shows information about the transaction including the amount of money to debited from the credit card account. The amount of money to be debited from the credit card account is preferably the amount of money requested to be sent to the receiver 18 plus a transaction fee. Once the sender 16 confirms the information, the sender 16 clicks on a "send now" button via a mouse and the money-mailing system 10 proceeds to the seventh stage.

Figure 7:
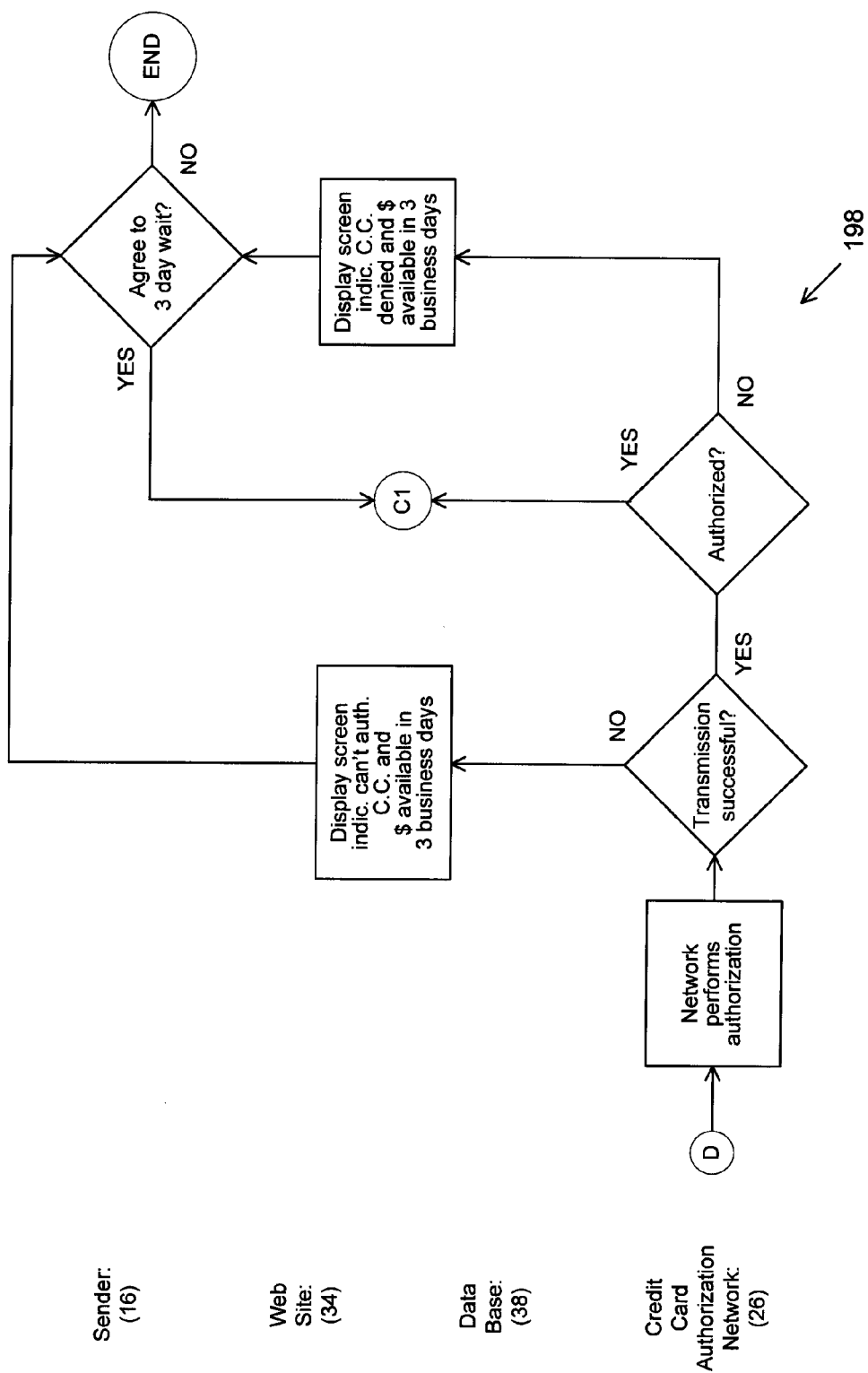
FIG. 7 is a flow chart diagrammatically illustrating a credit card authorization process of the money-mailing method of FIG. 2.

The seventh stage 198 of the money-mailing system 10 is a credit card authorization process. As best shown in FIG. 7, if an express check or credit card is requested, the web server 34 transmits the credit card transaction to the credit card authorization network 26. If the transmission of the credit card transaction is not successful, the web site 34 displays a "technical difficulties page" and informs the sender 16 that the credit card cannot be authorized at this time and that check funds can be available in four business days with an ordinary check transaction. If the sender 16 does not agree to the four day waiting period, the web site displays an "exit page". If the sender 16 agrees to the four day waiting period, the money-mailing system 10 proceeds to the sixth stage 196 as described in detail hereinabove 196 (the same as for an ordinary check). If the transmission of the credit card transaction is successful and the credit card transaction is denied, the web site 34 displays a "credit card denial page" and informs the sender 16 that the check funds can be available in four business days. If the sender 16 does not agree to the four day waiting period, the web site 34 displays an "exit page". If the sender 16 agrees to the four day waiting period, the money-mailing system 10 proceeds to the sixth stage 196 as described in detail hereinabove (the same as for an ordinary check). If the transmission of the credit card transaction is successful and the credit card transaction is for an express check and is approved, the money-mailing system 10 proceeds to the sixth stage 196 as described in detail hereinabove (the same as for an ordinary check).). If the transmission of the credit card transaction is successful and the credit card transaction is for an ordinary credit card transaction and is approved, the money-mailing system 10 proceeds to the eighth stage 200.

The eighth stage 200 of the money-mailing system 10 is an e-mail sending process. The money-mailing system 10 sends an e-mail to the receiver 18 informing them of money sent from the sender 16 and providing instructions to go to the money-mailing-system web site 34 to receive the money. Preferably, the e-mail is provided with an embedded link (URL) to the money-mailing-system web site 34. The money-mailing system 10 also sends an e-mail to the sender 16 confirming that the e-mail with money has been sent to the receiver 18.

Figure 8:
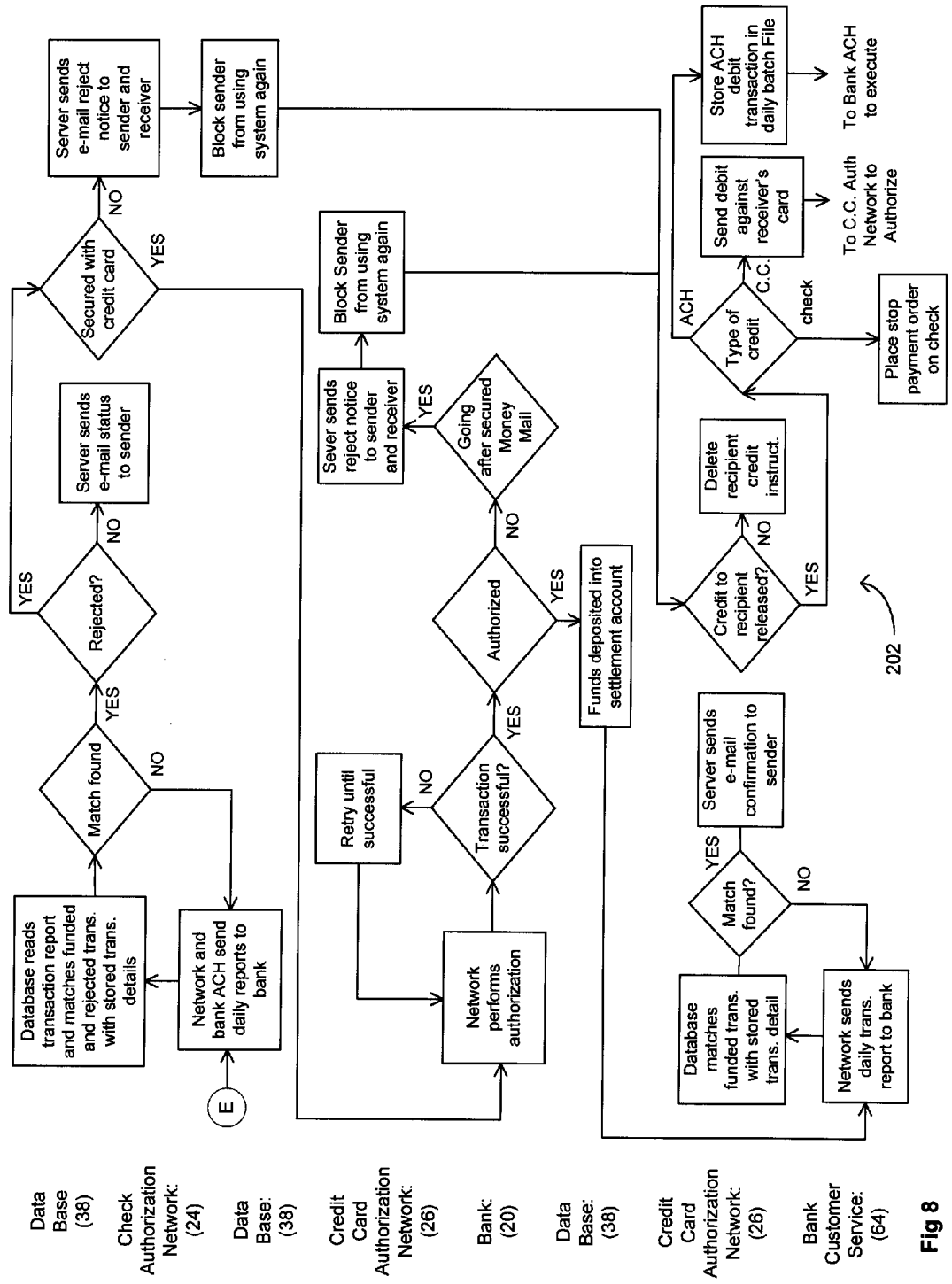
FIG. 8 is a flow chart diagrammatically illustrating a settlement process of the money-mailing method of FIG. 2.

A ninth stage 202 of the of the money-sending system 10 is a settlement process. As best shown in FIG. 8, the check authorization network 24 and the bank ACH 56 send daily transaction reports to the bank 20. The database 36 reads the daily transaction reports and searches for matches between stored transactions of the money-mailing system 10 and funded or rejected transactions of the daily transaction reports. If a funded match is found, the web server 32 sends an e-mail to the sender 16 informing the sender 16 of the status of the transaction.

If a rejected match is found and it was an ordinary check, that is a check not secured with a credit card, the web server 34 sends an e-mail to the sender 16 and the receiver 18 informing each of them of the rejection. The money-mailing system 10 preferably blocks the sender 16 from using the money-mailing system 10 again by storing the sender 16 as a customer "not in good standing". If the funds have not been released to the receiver 18, the credit instruction to the receiver 18 is removed. If the funds have been released to the receiver 18 and the funds were released via an ACH transaction, the database 36 stores an ACH debit transaction in the daily batch file which is sent to the bank ACH 56 to execute. If the funds have been released to the receiver 18 and the funds were released via a credit card transaction, the database 36 sends a debit transaction against the receiver's credit card to the credit card authorization network 26 for authorization. If the funds have been released to the receiver 18 and the funds were released via a paper check, the bank customer service department 64 issues a stop payment order on the paper check.

If a rejected match is found and it was an express check transaction, that is a check transaction secured with a credit card, the web server 34 sends a debit transaction to the credit card authorization network 26. If the credit card transaction is denied, the web server 34 sends an e-mail to the sender 16 and the receiver 18 informing each of them of the rejection. The money-mailing system 10 preferably blocks the sender 16 from using the money-mailing system 10 again by storing the sender 16 as a customer "not in good standing". If the funds have not been released to the receiver 18, the credit instruction to the receiver 18 is removed. If the funds have been released to the receiver 18 and the funds were released via an ACH transaction, the database 36 stores an ACH debit transaction in the daily batch file which is sent to the bank ACH 56 to execute. If the funds have been released to the receiver 18 and the funds were released via a credit card transaction, the database 36 sends a debit transaction against the receiver's credit card to the credit card authorization network 26 for authorization. If the funds have been released to the receiver 18 and the funds were released via a paper check, the bank customer service department 64 issues a stop payment order on the paper check. If the credit card transaction is approved, the funds are deposited into a settlement account. The database 36 reads the daily transaction reports and searches for a match between credit card and funded or rejected transactions of the daily transaction reports. When a funded match is found, the web server 32 sends an e-mail to the sender 16 informing the sender 16 of the status of the credit card transaction.

Figure 9:
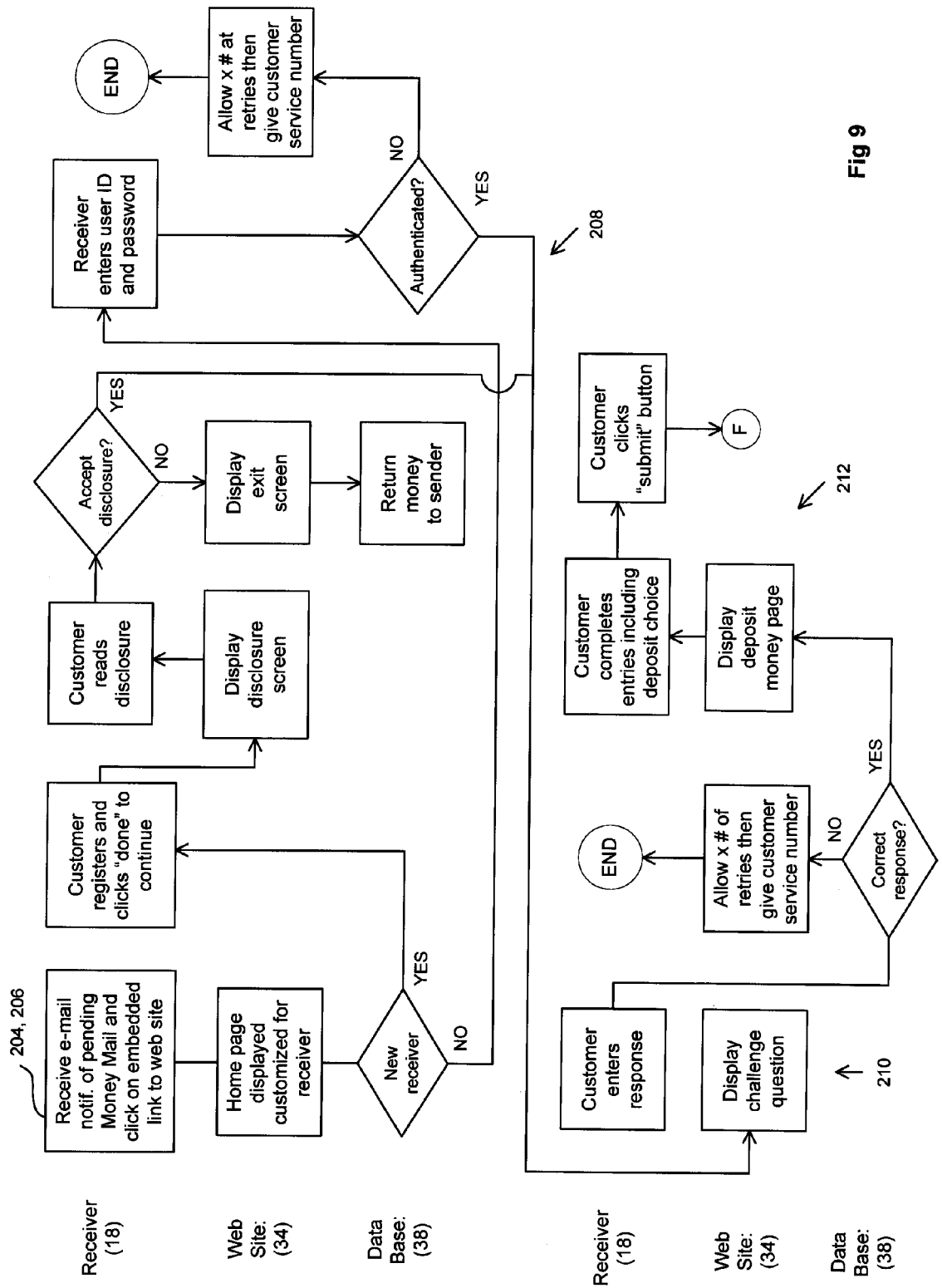
FIG. 9 is a flow chart diagrammatically illustrating registration and/or login process for the receiver, a challenge question process, and a receive money process of the money-mailing method of FIG. 2.

Tenth and eleventh stages 204, 206 of the money-mailing system 10 are respectively an e-mail receiving process and a web-site visiting process. As best shown in FIG. 9, the receiver 18 preferably clicks on an embedded link to the web site 34 when the receiver 18 receives the e-mail informing them of the money sent from the sender 16. The web site 34 preferably displays a "home page" customized for receivers 18 and inquires whether the receiver 18 is a first time receiver from the money-mailing system 10.

A twelfth stage 208 of the money-mailing system 10 is a registration and/or login process for the receiver. If the receiver 18 is not a first time receiver, they are requested to enter their login name and password. The money-mailing system 10 then authenticates that the login name and the password input by the receiver 18 are for a customer in "good standing". If the input information cannot be authenticated, the receiver 18 is preferably given at least one additional try to input the information. If the receiver 18 fails to be authenticated within a predetermined number of retries, the web site 34 displays an "exit page" which preferably provides a phone number for the customer service department 64. If the receiver 18 is authenticated, the money-mailing system 10 proceeds to a thirteenth stage 210 as described in detail hereinbelow.

If the receiver 18 is a first time receiver 18, the web site 34 displays a "new receiver page" and requests the receiver 18 to register as a receiver 18 by providing receiver-identification information which can be similar to the sender-identification information 106. Once the requested receiver-identification information is input, the receiver 18 clicks on a "done" button via a mouse to continue. The web site 34 then displays a "disclosure page" showing a disclosure regarding the money mailing system 10 and requests the receiver 18 to read the disclosure and indicate whether they accept the terms of the disclosure. If the receiver 18 does not accept the terms of the disclosure, the web site 34 displays the "exit page". If the receiver 18 accepts the terms of the disclosure, the money mailing system 10 begins a process of authenticating the receiver-identification information provided by the receiver 18 to approve or deny the receiver 18 as a customer in "good standing". If the receiver 18 is authenticated, the money-mailing system 10 proceeds to the thirteenth stage 210. It is noted that the challenge question portion of the money-mailing method can be eliminated if desired such as, for example, when the sender 16 is sending money to a charitable organization.

The thirteenth stage 210 of the money-mailing system 10 is a challenge question process. Once the receiver 18 is authenticated as a customer in good standing, the web site 34 displays the challenge question 164 and requests the receiver 18 to respond. If the receiver 18 fails to respond to the challenge question 164 with the valid response 166, the receiver 18 is preferably given at least one additional try to correctly respond. If the receiver 18 fails to correctly respond within a predetermined number of retries, the web site 34 displays an "exit page" which preferably provides a phone number for the customer service department 64. The money-mailing system 10 also sends an e-mail to the sender 16 informing them of the receiver's failure to correctly respond to the challenge question 164. If the receiver 18, correctly responds to the challenge question 164, the money-mailing system 10 proceeds to a fourteenth stage 212.

The fourteenth stage 212 of the money-mailing system 10 is a receive money process. If the receiver 18 correctly responds to the challenge question 164, the web site 34 displays a "deposit money page" and requests the receiver 18 to identify a deposit account for receiving the money, such as, for example, by electronic deposit to a checking or savings account (a direct deposit), a credit to a credit card account, or by paper check. Once the receiver 18 chooses deposit account, the receiver clicks on a "submit" button via a mouse and the money-mailing system 10 proceeds to a fifteenth stage 214 (if an electronic deposit), to a sixteenth stage 216 as described in detail hereinbelow (if a credit card credit), or to a seventeenth stage 218 as described in detail hereinbelow (if a paper check).

Figure 10:
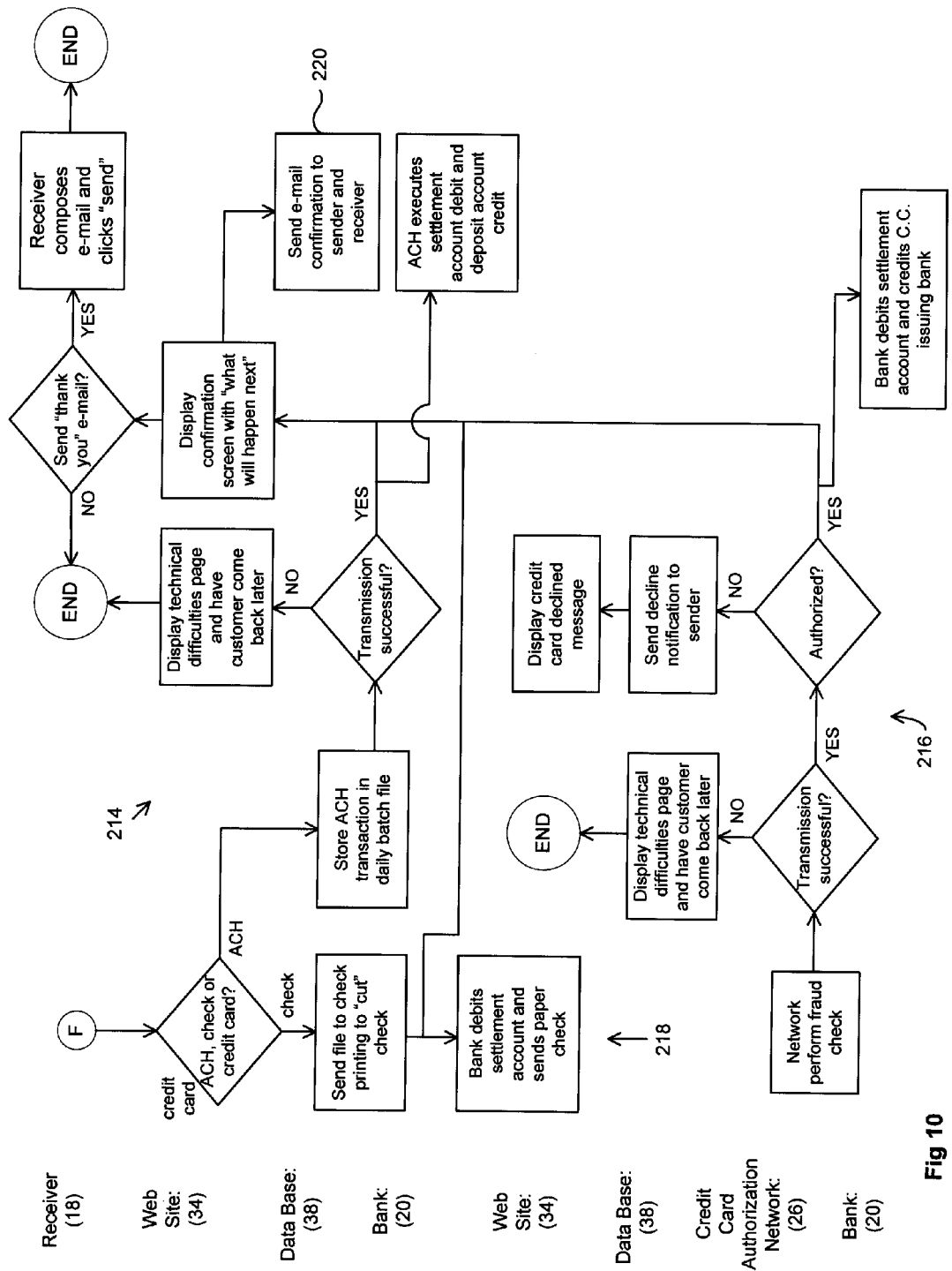
FIG. 10 is a flow chart diagrammatically illustrating recipient an ACH account process, a credit card account process, and a paper check process of the money-mailing method of FIG. 2.

The fifteenth stage 214 of the money-mailing process 10 is an ACH account process. As best shown in FIG. 10, if an ACH transaction is selected by the receiver 18, the data base 38 stores the ACH transaction in the daily batch file. If storage of the ACH transaction is not successful, the web site 34 displays a "technical difficulties page" and informs the receiver 18 to come back to the web site 34 at a later time to complete the transaction. If storage of the ACH transaction is successful, the web site 34 displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system 10 proceeds to an eighteenth stage 220 as described in detail hereinbelow. The money-mailing-system database 38 collects the daily batch entries and sends them to the bank ACH 56 which executes a debit to the settlement account and a credit to the receiver's account.

The sixteenth stage 216 of the money-mailing process 10 is a credit card account process. If a credit to a credit card account is selected, the credit card transaction is sent to the credit card authentication network 26 to perform a "fraud check". If the transmission of the credit card transaction is not successful, the web site 34 displays a "technical difficulties page" and informs the receiver 18 to come back to the web site 34 at a later time to complete the transaction. If the transmission of the credit card transaction is successful and the credit card transaction is denied, the web site 34 displays a "credit card denied page" and preferably provides a phone number for the credit card authorization network 26. If the transmission of the credit card transaction is successful, and the credit card transaction is approved, the web site 34 displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system 10 proceeds to the eighteenth stage 220 as described in detail hereinbelow. The money-mailing-system database 38 collects the daily batch entries and sends them to the bank 20 which executes a debit to the settlement account and a credit to the receiver's account at the credit card issuing bank.

The seventeenth stage 218 of the money-mailing process 10 is a paper check process. If a paper check is chosen, the web site 34 displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system database 38 sends a "cut check" request to the bank check printing service 254. The bank check printing service 254 sends a paper check to the receiver 18 via a physical mail service and the bank holding or settlement account is debited once the paper check is cashed. The paper check is preferably for the amount sent by the sender 16 less a check printing fee. The money-mailing system 10 proceeds to the eighteenth stage 220.

An eighteenth stage 220 of the money-sending system 10 is an e-mail sending process. The money-mailing system 10 sends an e-mail to the sender 16 and the receiver 18 confirming the status of the transaction. It is noted that the above-described money-mailing system 10 operates in a seamless manner and the identified divisions between the various stages is for descriptive purposes only. It is also noted that each of the stages and/or steps within each stage are not required for each transaction and each of the stages and/or steps within each stage can occur in a different order except as specifically noted.

FIG. 16 illustrates a second embodiment of the money-mailing method wherein the sender 16 (such as a customer or a charitable giver) sends e-mailed money to the receiver 18 (such as a merchant or a charitable organization) in response to an e-mailed invoice or request. The second embodiment of the money-mailing method can operate generally the same as described above with regard to the first embodiment except that the receiver 18 that the transaction rather than the sender 16. Therefore, this variation of the money-mailing system is particularly useful for merchants to send invoice e-mails to customers or charitable organizations to send solicitation e-mails to potential givers. An invoice e-mail to a sender 16 would preferably specify the amount of money to be sent to the receiver 18 while a solicitation e-mail from a charitable organization would preferably not specify the amount of money to be sent unless it is a notice or reminder of a previous pledge. In a receiver initiated transaction, the money deposited into the receiver's account is preferably the amount of money sent from the sender less a fee for initiating the transaction. The receiver 18 can preferably visit the web site 34 separate from an embedded link in the e-mail so that multiple transactions can be more easily processed. The web site 34 preferably has an "in-box" which lists all deposits for the receiver 18 to expedite batch processing of multiple deposits all at once.

It is apparent from the above description that the money-mailing system and method of the present invention enable one computer network user (the sender) to easily and rapidly send money to another computer network user (the receiver). Importantly, the receiver is not required to have a credit card merchant account and the sender is not required to have a credit card.

Although particular embodiments of the invention have been described in detail, it is understood that the present invention is not limited correspondingly in scope, but includes all changes and modifications known to those skilled in the art and all changes and modifications coming within the spirit and terms of the claims appended hereto.

What is claimed is:

1. A method of transferring money from a sender to a receiver utilizing a computer network including a server, the method comprising the steps of:
   (a) the server receiving a sender identifier and a deposit account identifier from the receiver, the sender identifier associated with a sender from whom money is to be transferred to the receiver and the deposit account identifier associated with a deposit account to which money is to be transferred;
   (b) the server sending an electronic message to the sender over the network to inform the sender that the sender should transfer money to the receiver and to request the sender to contact the server to transfer money, the sender not being in contact with the server at the time of the server sending the electronic message to the sender;
   (c) the server receiving a response to the electronic message and identifying a withdraw account from which money is to be transferred;
   (d) transferring money from the withdraw account; and
   (e) transferring money to the deposit account.

2. The method according to claim 1, further comprising the step of the server receiving from the receiver an amount of money to be transferred from the sender to the receiver.

3. The method according to claim 2, wherein said step of identifying the withdraw account includes identifying a credit card account.

4. The method according to claim 3, further comprising the step of the server transmitting information regarding the credit card transaction to a credit card authorization network for approval.

5. The method according to claim 1, further comprising the step of the server receiving from the receiver a network address of the receiver for receiving electronic messages.

6. The method according to claim 5, further comprising the step of sending an electronic message over the network to the receiver confirming that the server has sent an electronic message to the sender informing the sender that the sender should transfer money after the step of the server sending an electronic message to the sender over the network to inform the sender that the sender should transfer money.

7. The method according to claim 5, further comprising the step of sending an electronic message over the network to the receiver confirming that the sender has contacted the server in response to the electronic message after the step of the sender contacting the server in response to the electronic message.

8. The method according to claim 5, further comprising the step of sending an electronic message over the network to the receiver confirming that the amount of money has been transferred to the deposit account after the step of transferring money to the deposit account.

9. The method according to claim 1, wherein said step of sending an electronic message to the sender includes identifying to the sender the amount of money to be transferred.

10. The method according to claim 1, wherein said step (c) includes identifying a checking account.

11. The method according to claim 10, further comprising the step of the server transmitting the check transaction to a check authorization network for approval.

12. The method according to claim 10, wherein said step of transferring money to the deposit account includes transferring money to the deposit account within about twenty four hours.

13. The method according to claim 10, wherein said step of transferring money to the deposit account includes transferring money to the deposit account in about four business days.

14. The method according to claim 10, further comprising the step of the sender identifying, to the server, a credit card account to secure transactions from the checking account.

15. The method according to claim 14, further comprising the step of the server transmitting information regarding the credit card transaction to a credit card authorization network for approval.

16. The method according to claim 14, wherein said step of transferring money to the deposit account includes transferring money to the deposit account within about twenty four hours.

17. The method according to claim 1, further comprising the step of the server receiving from the receiver a network address of the sender for receiving electronic messages.

18. The method according to claim 17, further comprising the step of sending an electronic message over the network to the sender confirming that money has been transferred from the withdraw account after the step of transferring money from the withdraw account.

19. The method according to claim 17, further comprising the step of sending an electronic message over the network to the sender confirming that money has been transferred to the deposit account after the step of transferring money to the deposit account.

20. The method according to claim 1, wherein the step of transferring money from the withdraw account includes depositing money into a holding account.

21. The method according to claim 20, wherein the step of transferring money to the deposit account includes withdrawing money from the holding account.

22. The method according to claim 1, further comprising the step of approving or denying the sender as a customer in good standing including transmitting sender-identification information including a name of the sender to an applicant verification network.

23. The method according to claim 1, wherein said step of the server sending an electronic message to the sender over the network includes embedding a URL for contacting the server in the electronic message.

24. The method according to claim 1, wherein said step of transferring money to the deposit account includes deducting a fee from the amount of money and transferring the amount of money less the fee to the deposit account.

25. The method of claim 1, further including:
the server inputting a challenge question from sender;
the server outputting the challenge question to the receiver; and
the server inputting a response to the challenge question, from the receiver, so as to provide a level of security that the receiver is the intended receiver.

26. A method for transferring money from a sender to a receiver utilizing a computer network including a server, the server in the form of a tangibly embodied computer processor, the method comprising the steps of:
receiving over the computer network from a tangibly embodied receiver computer processor of the receiver:
a sender identifier identifying the owner of a withdraw account; and
a deposit account identifier identifying a deposit account to which money is to be transferred;
sending, by the server, an electronic message to the sender over the computer network using the sender identifier, the electronic message containing information that constitutes a request for the sender to contact the server to transfer money to the receiver, the sender not being in contact with the server at the time of the server sending the electronic message to the sender;
receiving, by the server, over the computer network a withdraw account identifier from the sender, the withdraw account identifier identifying the withdraw account from which money is to be transferred;
initiating a transfer of money, by the server, from the withdraw account to the deposit account using the deposit account identifier, the initiating the transfer being in response to the server receiving the withdraw account identifier from the sender; and
the server performing a settlement process in which the server performs a search for the initiated transfer of money against a listing of funded and rejected transactions of daily transaction reports; and
performing the transfer of money to the deposit account of the receiver, upon the server matching the transfer of money against a listed funded transaction of the daily transaction reports.

27. The method of claim 26, wherein the sending the electronic message to the sender over the computer network using the sender identifier is performed using an e-mail, such that the sender is not a participant in, and takes no action in conjunction with, the sending the electronic message.

28. A method of transferring money from a sender to a receiver utilizing a computer network including a server, the method comprising the steps of:
(a) providing a web site that is associated with the server;

(b) the server receiving a sender identifier and a deposit account identifier from the receiver, the sender identifier associated with a sender from whom money is to be transferred to the receiver and the deposit account identifier associated with a deposit account to which money is to be transferred;
(c) the server sending an electronic message to the sender over the network to authenticate the sender, the electronic message being in the form of an e-mail from the server to the sender, and the sender also communicating with the server via the web site at the time that the e-mail is sent from the server to the sender;
(d) the server receiving a response to the electronic message;
(e) the server identifying a withdraw account from which money is to be transferred;
(f) transferring money from the withdraw account;
(g) transferring money to the deposit account
(h) the server inputting a challenge question from sender;
(i) the server outputting the challenge question to the receiver; and
(j) the server inputting a response to the challenge question from the receiver, so as to provide a level of security that the receiver is the intended receiver.

29. A method of transferring money from a sender to a receiver utilizing a computer network including a server, the method comprising the steps of:
(a) the server receiving a sender identifier and a deposit account identifier from the receiver, the sender identifier associated with a sender from whom money is to be transferred to the receiver and the deposit account identifier associated with a deposit account to which money is to be transferred;
(b) the server sending an electronic message to the sender over the network to inform the sender that the sender should transfer money to the receiver and to request the sender to contact the server to transfer money, the sender not being in contact with the server at the time of the server sending the electronic message to the sender;
(c) the server receiving a response to the electronic message and identifying a withdraw account from which money is to be transferred;
(d) transferring money from the withdraw account;
(e) transferring money to the deposit account;
(f) the receiver sending an e-mail to the sender, such e-mail constituting an invoice e-mail from the receiver to the sender that specifies the amount of money due from the sender to the receiver
(g) the server inputting a challenge question from sender;
(h) the server outputting the challenge question to the receiver;
(i) the server inputting a response to the challenge question from the receiver; and
(j) the server assessing the validity of the challenge question, so as to provide a level of security that the receiver is the intended receiver.

* * * * *